US007305465B2

(12) United States Patent
Wing et al.

(10) Patent No.: US 7,305,465 B2
(45) Date of Patent: Dec. 4, 2007

(54) COLLECTING APPLIANCE PROBLEM INFORMATION OVER NETWORK AND PROVIDING REMOTE TECHNICAL SUPPORT TO DELIVER APPLIANCE FIX INFORMATION TO AN END USER

(76) Inventors: Robert Wing, 1540 Ford Ct., Louisville, CO (US) 80027; John W. Fisher, Jr., 10448 Jellison Way, Westminster, CO (US) 80021

( * ) Notice: Subject to any disclaimer, the term of this patent is extended or adjusted under 35 U.S.C. 154(b) by 0 days.

(21) Appl. No.: 10/991,978

(22) Filed: Nov. 17, 2004

(65) Prior Publication Data
US 2005/0120112 A1     Jun. 2, 2005

Related U.S. Application Data

(63) Continuation-in-part of application No. 10/450,011, filed on Nov. 5, 2003, now abandoned, which is a continuation-in-part of application No. 09/713,966, filed on Nov. 15, 2000, now abandoned.

(60) Provisional application No. 60/520,957, filed on Nov. 17, 2003.

(51) Int. Cl.
  *G06F 15/173* (2006.01)
  *G06F 15/16* (2006.01)
  *G06F 3/00* (2006.01)
  *G06F 7/00* (2006.01)
(52) U.S. Cl. .................... 709/223; 709/217; 715/740; 715/744; 707/10
(58) Field of Classification Search ........ 709/217–235, 709/200–207, 250; 718/102–104; 719/310, 719/311, 315–318; 715/700, 721, 735–744, 715/809–820; 707/10, 3, 102; 700/9, 17; 705/1, 500, 8, 22, 28, 9, 2; 714/4, 46–48; 717/168–178
See application file for complete search history.

(56) References Cited

U.S. PATENT DOCUMENTS 5,367,667 A    11/1994 Wahlquist et al.

(Continued)

FOREIGN PATENT DOCUMENTS

GB        9800534.1         1/1998

(Continued)

OTHER PUBLICATIONS

PC-Doctor, Inc., Product Information, *PC-Doctor for Windows Product Overview* [Online] http://www.ws.com/products, printed Oct. 9, 2000, copyright 1995-2000.

(Continued)

*Primary Examiner*—Haresh Patel
(74) *Attorney, Agent, or Firm*—Sheridan Ross PC

(57) ABSTRACT

A system for the intelligent management of knowledge and delivery of content is provided. The system allows end users to access targeted fixes in connection with resolving problems with appliances, such as computers or other devices. The system further provides for the delivery of inventory information and information regarding attempts that have been made to fix problems with an appliance to technical support personnel. Technical support personnel may selectively access approved fixes or potential fixes through selections made from a tree of devices and/or problems or through the identification of key indicators. Technicians may also create fixes and made such fixes available to other technicians immediately.

5 Claims, 23 Drawing Sheets

U.S. PATENT DOCUMENTS

| | | | |
|---|---|---|---|
| 5,388,252 | A | 2/1995 | Dreste et al. |
| 5,455,933 | A | 10/1995 | Schieve et al. |
| 5,581,686 | A | 12/1996 | Koppolu et al. |
| 5,732,268 | A | 3/1998 | Bizarri |
| 5,797,135 | A | 8/1998 | Whalen et al. |
| 5,815,652 | A | 9/1998 | Ote et al. |
| 5,878,257 | A | 3/1999 | Nookala et al. |
| 5,901,286 | A * | 5/1999 | Danknick et al. ........... 709/203 |
| 5,908,471 | A | 6/1999 | Lach et al. |
| 5,926,621 | A | 7/1999 | Schwarz et al. |
| 5,983,364 | A | 11/1999 | Bortcosh et al. |
| 5,996,073 | A | 11/1999 | Lee et al. |
| 6,047,268 | A | 4/2000 | Bartoli et al. |
| 6,101,510 | A | 8/2000 | Stone et al. |
| 6,145,096 | A | 11/2000 | Bereiter et al. |
| 6,163,859 | A | 12/2000 | Lee et al. |
| 6,279,109 | B1 | 8/2001 | Brundridge |
| 6,314,439 | B1 | 11/2001 | Bates et al. |
| 6,357,017 | B1 | 3/2002 | Bereiter et al. |
| 6,442,684 | B1 | 8/2002 | Lee et al. |
| 6,477,531 | B1 | 11/2002 | Sullivan et al. |
| 6,519,762 | B1 | 2/2003 | Colligan et al. |
| 6,539,499 | B1 | 3/2003 | Stedman et al. |
| 6,542,898 | B1 | 4/2003 | Sullivan et al. |
| 6,557,029 | B2 * | 4/2003 | Szymansky ................. 709/206 |
| 6,571,236 | B1 * | 5/2003 | Ruppelt ......................... 707/3 |
| 6,606,744 | B1 * | 8/2003 | Mikurak ..................... 717/174 |
| 6,615,240 | B1 * | 9/2003 | Sullivan et al. ............ 709/205 |
| 6,631,496 | B1 * | 10/2003 | Li et al. .................. 715/501.1 |
| 6,671,818 | B1 * | 12/2003 | Mikurak ........................ 714/4 |
| 6,697,824 | B1 * | 2/2004 | Bowman-Amuah ......... 709/229 |
| 6,742,141 | B1 | 5/2004 | Miller |
| 6,904,449 | B1 * | 6/2005 | Quinones .................... 709/203 |
| 6,915,342 | B1 * | 7/2005 | Motoyama ................. 709/224 |
| 6,944,596 | B1 * | 9/2005 | Gray et al. ..................... 705/1 |
| 2001/0032244 | A1 * | 10/2001 | Neustel ...................... 709/206 |
| 2001/0042117 | A1 * | 11/2001 | Yoshino et al. ............ 709/223 |
| 2002/0047051 | A1 * | 4/2002 | Borders et al. ............... 239/69 |
| 2002/0076674 | A1 * | 6/2002 | Kaplan ....................... 434/107 |
| 2002/0107716 | A1 | 8/2002 | Callahan et al. |
| 2002/0118220 | A1 * | 8/2002 | Lui et al. .................... 345/709 |
| 2002/0184118 | A1 * | 12/2002 | Gronemeyer et al. ......... 705/28 |
| 2002/0188706 | A1 | 12/2002 | Richards et al. |
| 2002/0194047 | A1 * | 12/2002 | Edinger et al. ................. 705/9 |
| 2003/0101083 | A1 * | 5/2003 | Venkatesh et al. ............. 705/8 |
| 2003/0140037 | A1 * | 7/2003 | Deh-Lee ........................ 707/3 |
| 2004/0044585 | A1 * | 3/2004 | Franco ........................ 705/26 |
| 2004/0064351 | A1 * | 4/2004 | Mikurak ........................ 705/7 |
| 2004/0202290 | A1 * | 10/2004 | Zellner ........................ 379/45 |
| 2005/0015678 | A1 * | 1/2005 | Miller ......................... 714/38 |

FOREIGN PATENT DOCUMENTS

| | | |
|---|---|---|
| GB | 2 333 169 | 7/1999 |
| GB | 233169 A | 7/1999 |
| JP | 09-297694 | 11/1997 |
| JP | 10-254726 | 9/1998 |
| JP | 11-143730 | 5/1999 |

OTHER PUBLICATIONS

Motive Communications, Inc., brochure entitled *Motive-Powered e-Service: The Complete Solution for Business Applications*, copyright 2000.

Motive Communications, Inc., brochure entitled *Motive-Powered e-Service: The Complete Solution for IT*, copyright 2000.

Motive Communications, Inc., Product Information, *Motive Solo*, printed Oct. 9, 2000, copyright 1998-2000.

Support.com, Inc., Product Information [Online] http://www.support.com/solutions/products, printed Oct. 9, 2000, copyright 2000.

Motive Communications, Inc., Resource Center page [Online] http://www.motive.com/library/labindex.asp, printed Nov. 30, 1999, copyright 1998-1999.

Lyons, Daniel, *Computer, Heal Thyself* [Online] http://www.forbes.com/forbes/99/1115/6412238a.htm, printed Nov. 30, 1999.

Motive Communications, Inc., *Spotlight on Motive & Dell* [Online] http://www.motive.com/dellspotlight, printed Nov. 30, 1999.

Dell Computer Corporation, *The Dell -E Support Story* [Online] http://www.dell.com/us/en/biz/services/esupport_1_about.htm, printed Nov. 30, 1999, copyright 1999.

Levin, Carol, *Self-Service Repairs*, ZD Net PC Magazine Trends [Online] http://www.zdnet.com/pcmag/stories/trends/0,7607,2311756,00.html, printed Nov. 30, 1999, copyright 1999.

Motive Communications, Inc., *Motive Software to Power Gateway's Next-Generation E-Support* [Online] http://www.motive.com/who/news_press_gateway.html, printed Sep. 20, 1999, copyright 1998-1999.

IET—Intelligent Electronics, *Techmate ITM Intelligent Troubleshooting Manual Overview and Section 3, Enterprise Architecture*, [Online] http://www.iet-techmate.com/ttst.html, printed Sep. 15, 1999, copyright 1998-1999.

Sehmi, Arvindra et al., *WebLS: A Custom Prolog Rule Engine for Providing Web-Based Tech Support* [Online] http://clement.info.umoncton.ca/~lpnet/lp-internet/amzi/lspap.html, printed Sep. 15, 1999.

Werbach, Kevin, *Making Software Work Better*, Rescue [Online] http://www.rescueme.net/pressroom/dec02.html, printed Sep. 15, 1999, copyright 1998.

Motive Communications, Inc., *Motive Duet Named "Most Innovative" Technical Support Tool of 1999 by IT Support News Magazine* [Online] http://www.motive.com/who/news_press_award.html, printed Nov. 30, 1999, copyright Aug. 24, 1999.

Martin, Luis, *Dell OpenManage™ Resolution Assistant Offers Advanced System Support* [Online] http://www.dell.com/us/en/dhs/vectors/vectors_1999-res_asst.html, Nov. 30, 1999, copyright Aug. 1999.

Needle, David, *The Holy Grail of Tech Support: Automation*, Techweek [Online] http://www.techweek.com/articles/7-12-99/needle.html, printed Nov. 30, 1999, copyright, Jul. 12, 1999.

Tioga Systems, Inc., brochure entitled *Tioga Healing System 2.0*, copyright 1999.

Motive Communications, Inc., *Motive Communications Wins Call Centersolutions Product of the Year* [Online] http://motive.com/who/news_press_prodofyear.html, printed Sep. 15, 1999, copyright Dec. 15, 1998.

PC-Doctor, Inc., Products Information, "PC-Doctor for Windows Product Overview" [online] http://www.ws.com/products/windows.htm, printed Oct. 9, 2000, copyright 1995-2000, pp. 1-3.

Motive Communications, Inc., brochure entitled "Motive-Powered e-Service: The Complete Solution for Business Applications", copyright 2000, pp. 1-2.

Motive Communications, Inc., brochure entitled "Motive-Powered e-Service: The Complete Solution for IT", copyright 2000, pp. 1-2.

Motive Communications, Inc., Product Information, "Motive Solo", printed Oct. 9, 2000, copyright 1998-2000, pp. 1-2.

Support.com, Product Information [Online] http://www.support.com/solutions/products, printed Oct. 9, 2000, copyright 2000, pp. 1-8.

Motive Communications, Inc., Resource Center page [online] http://www.motive.com/library/labindex.asp, printed Nov. 30, 1999, copyright 1998-99; pp. 1-3.

Lyons, Daniel, "Computer, Heal Thyself" [Online] http://www.forbes.com/forbes/99/1115/64122238a.htm, printed Nov. 30, 1999, pp. 1-4.

Motive Communications, Inc., "Spotlight on Motive & Dell" [online] http://www.motive.com/dellspotlight, printed Nov. 30, 1999, pp. 1-3.

Dell Computer Corporation, "The Dell E-Support Story" [online] http://www.dell.com/us/en/biz/services/esupport_1_about.htm, printed Nov. 30, 1999, copyright 1999, pp. 1-2.

Levin, Carol, "Self-Service Repairs", ZD Net PC Magazine Trends [online] http://www.zdnet.com/pcmag/stories/trends/0,7607,2311756,00.html, printed Nov. 30, 1999, copyright 1999, pp. 1-2.

Motive Communications, Inc., "Motive Software to Power Gateway's Next-Generation E-Support" [online] http://www.motive.com/who/news—press—gateway.html, printed Sep. 20, 1999, copyright 998-99, pp. 1-3.

IET - Intelligent Electronics, "Techmate ITM Intelligent Troubleshooting Manual Overview" [online] http://www.iet-techmate.com/ttst.html, printed Sep. 15, 1999, pp. 1-2.

Sehmi, Arvindra et al., "WebLS: A Custom Prolog Rule Engine for Providing Web-Based Tech Support" [online] http://clement.info.umoncton.ca/~lpnet/lp-internet/amzi/lspap.html, printed Sep. 15, 1999, pp. 1-19.

Werbach, Kevin, "Making Software Work Better", Rescue [online] http://www.rescueme.net/pressroom/dec02.html, printed Sep. 15, 1999, copyright 1998, pp. 1-2.

Motive Communications, Inc., "Motive Duet Named 'Most Innovative' Technical Support Tool of 1999 by IT Support News Magazine" [online] http://motive.com/who/news_press_award.html, printed Nov. 30, 1999, copyright Aug. 24, 1999, pp. 1-3.

Martin, Luis et al., "Dell OpenManage Resolution Assistant Offers Advanced System Support" [online] http://www.dell.com/us/en/dhs/vectors/vectors_1999-res_asst.html, printed Nov. 30, 1999, copyright Aug. 1999, pp. 1-12.

Needle, David, "The Holy Grail of Tech Support: Automation", Techweek [online] http://www.techweek.com/articles/7-12-99/needle.html, printed Nov. 30, 1999, copyright Jul. 12, 1999, pp. 1-3.

Tioga Systems, Inc., brochure entitled "Tioga Healing System 2.0", copyright 1999, pp. 1-2.

Motive Communications, Inc., "Motive Communications Wins Call Centersolutions Product of the Year" [online] http://motive.com/who/news_press_prodofyear.html, printed Sep. 15, 1999, copyright Dec. 15, 1998, pp. 1-2.

Motive Communications, Inc., "The Key to Scaling and an Opportunity for Successful Growth" [online] http://www.motive.com/solutions/sol_feature.html, printed Oct. 9, 2000, pp. 1-4.

PC-Doctor, Inc., "PC-Doctor Products for the Computer Life Cycle" [online] http://www.ws.com/products/support.htm, printed Oct. 9, 2000, pp. 1-2.

IET - Intelligent Electronics, "3 TechMate's Enterprise Architecture" [online] http://www.iet-tech.com/stop3.htm, printed Sep. 15, 1999, pp. 1-2.

SIDDIQI, Office Action from related U.S Appl. No. 09/716,966, dated Apr. 8, 2004, pp. 1-23.

AWALEH, Examination Report from related Foreign Patent Application No. NZ 526097, dated Jul. 14, 2004, pp. 1-2.

SIDDIQI, Office Action from related U.S. Appl. No. 09/713,966, dated Oct. 22, 2004, pp. 1-17.

AWALEH, Examination Report from related Foreign Patent Application No. NZ 526097, dated Feb. 9, 2005, p. 1.

SIDDIQI, Office Action from related U.S. Appl. No. 09/713,966, dated Mar. 16, 2005, pp. 1-14.

SIDDIQI, Office Action from related U.S. Appl. No. 10/450,011, dated Jun. 21, 2005, pp. 1-23.

SIDDIQI, Office Action from related U.S. Appl. No. 09/713,966, dated Sep. 9, 2005, pp. 1-17.

SIDDIQI, Office Action from related U.S. Appl. No. 10/450,011, dated Dec. 12, 2005, pp. 1-20.

MAUNG, PCT International Search Report from related International Application No. PCT/US04/38728, dated Jan. 30, 2006, pp. 1-4.

RAMOS, Letter regarding MX Office Action, synopsis and partial translation only, dated Jul. 25, 2006, pp. 1-2.

GILLETT, Examiner's Report from related Foreign Patent Application No. AU 2002228620, dated Oct. 11, 2006, pp. 1-3.

Office Action from related Foreign Patent Application No. JP 2002-542967, dated Nov. 21, 2006, pp. 1-6.

SIDDIQI, Office Action from related U.S. Appl. No. 09/713,966, dated Feb. 8, 2007, pp. 1-2.

Gorzewski, Office Action from related Foreign Patent Application No. EP 01 989 734.7 - 2224, dated May 14, 2007, pp. 1-4.

VU, PCT International Search Report from related International Application No. PCT/US01/43538, dated May 23, 2002, pp. 1-3.

VU, PCT International Preliminary Examination Report from related International Application No. PCT/US01/43538, dated Nov. 27, 2002, pp. 1-4.

MAUNG, PCT Written Opinion of the International Search Authority from related International Application No. PCT/US04/38728, dated Jan. 30, 2006, pp. 1-7.

CUSSAC, International Preliminary Report On Patentability from related International Application No. PCT/US04/38728, dated Jun. 1, 2006, pp. 1-3.

* cited by examiner

FIG. 8

PUSH A URL OR POTENTIAL SOLUTION

FormProblemResolution

Problem Resolution

Enter the procedures or steps for this resolution

Fix Description:

Ticket Event Summary

11/12/2004 9:26:25 AM - Tech: Nick Hyatt
Event Notes: Ticket Created

Next Step:
11/12/2004 9:27:55 AM - Tech: Nick Hyatt
Event Notes: Had a question about which command to put into the Run line for a command prompt.

Next Step:

Ticket Events:  ⊙ View All Events   ○ View Selected Only

Event Type: Ticket Created Date: 11/12/2004 - Event Type: Ticket Created
Event Type: Phone Date: 11/12/2004 - Event Type: Phone Please select the event you feel resolved the issue. If the event was a PQF or Potential Solution, select the event and click save. All other events will require an incident Resolution Summary.

[ Cancel ]  [ Save ]

FIG. 9

SELECT PROBLEM

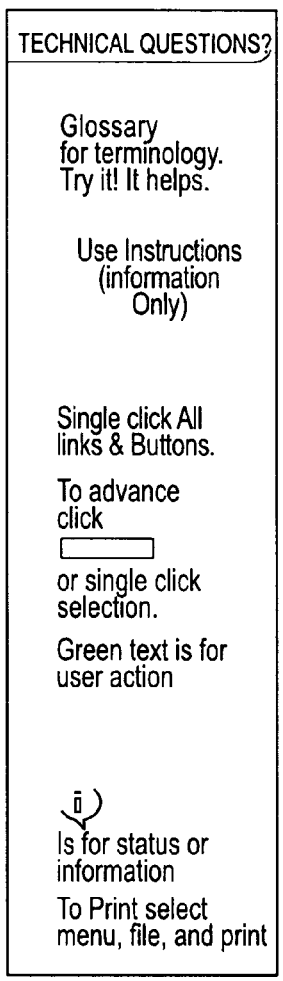

*pinpoint.com*

Customer Problem
Identification

Step 2

Problem Selection

You will now select the problem category that best describes the problem/question you have with your computer.

Problem Category Selection
(Click on the best description)

| | I want to remove viruses, pop-ups or spy ware | Please scroll down and view all options before making your choice. |

I have Internet or Browser Problems

My computer runs slow

I have abnormal or erratic system functionality

I have a software problem

I have a hardware Problem

I am not sure

Our 3-Step Computer Support Process Solves Computer Problems Quickly and Effectively.
User ID:1000021159

FIG.10

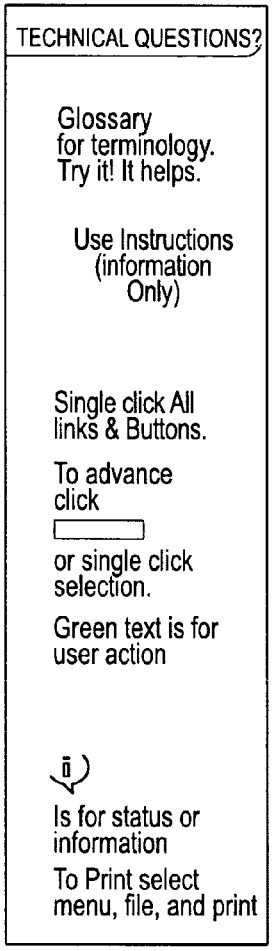

pinpoint.com

Customer Problem Identification

Step 2

Hardware Selection

You will now select the device or peripheral that you have a problem/ question with. Please select from the list below. Devices failing the test are listed first. If your device is not listed by manufacturer or model, please select 'Click here if not shown' on a like device.
Panel

Storage

• Floppy disk drive

• F:DM-828

• Click here if an installed FLOPPY/DISKETTE DRIVE is Not Shown

• Click here if an installed CDROM/DVD is Not Shown

• SAMSUNG DVD-ROM SD-616Q

• Click here if an installed DVDROM is Not Shown

Devices/Peripherals PASSING Test

System

• Intel(R) Xeon(TM) CPU 2.40G Hz

• American Megatrends     • 512 MB Bytes Total

FIG. 11A

Inc.                              Memory

Communications

- [00000001] Intel(R) PRO/1000 MT Server Adapter
- [00000003] Intel(R) PRO/100 S Server Adapter

- Click here if one of your NETWORK CARD's are Not Shown
- Click here if one of your NETWORK CARD's are Not Shown

Storage

- C:WDC WD600BB-00CAA1

- Click here if one of your HARD/FIXED DISK's are Not Shown

- TapeDrive
- D:Maxtor P54098H4

- Click here if one of your TAPE BACKUP's are Not Shown
- Click here if one of your HARD/FIXED DISK's are Not Shown

User Interface

- Standard 101l102-Key or Microsoft Natural PS/2 Keyboard
- Microsoft PS/2 Mouse

- Click here if one of your KEYBOARD's are Not Shown
- Click here if one of your POINTER's are Not Shown

Audio Video

- Creative AudioPCI (ES1371,ES1373) (WDM)
- ATI Technologies inc. RAGE XL PCI

- Click here if one of your SOUND CARD'S are Not Shown
- Click here if one of your VIDEO ADAPTER'S are Not Shown

FIG.11B

SELECT DEVICE

Attached Devices

• Intel(R) 82801CA/CAM
USB Universal Host
Controller - 2482

• Click here if one of your USB
CONTROLLER's are Not Shown

Printers

• hp officejet 7100 series fax

• hp officejet 7100 series

• Click here if one of your PRINTER's are Not Shown

• Click here if one of your PRINTER's are Not Shown

Ports

• ParallelPort

• Not Found

• CNXT V9x PCI Modem

• Communications Port (COM1)

Our 3-Step Computer Support Process Solves Computer Problems Quickly and Effectively.
User ID:1000021159

FIG.11C

SELECT SYMPTOM

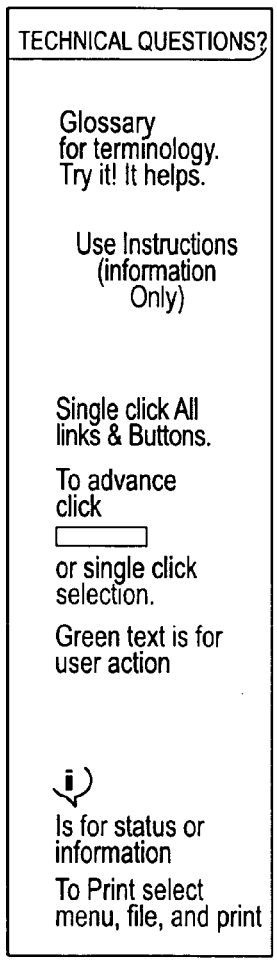

*pinpoint.com*

Customer Problem
Identification

Step 2

Hardware Symptom Selection

You will now choose the Problem/Symptom below that best describes the issue you are experiencing with your hardware. Select the "How-To" option to view additional useful instructions.

Problem Symptoms

NO SOUND
No Sound From CD ROM

CAN'T WRITE DATA
Cannot Write Data To CD-RW

CAN'T READ DATA
Cannot Read Data From CDROM

"How-To" Instructions

INSTALLATION
REMOVAL

Click Here to go back and select another problem.

Our 3-Step Computer Support Process Solves Computer Problems Quickly and Effectively.
User ID:1000021159

FIG.12

UTILITY OR TOOL WRAPING

*pinpoint.com*

Step 2

Customer Problem
Identification

Hardware Symptom Selection

You will now choose the Problem/Symptom below that best describes the issue you are experiencing with your hardware. Select the "How-To" option to view additional useful instructions.

Problem Symptoms

I WISH TO REMOVE ADVERTISEMENTS AND POP-UPS

MY BROWSER SETTINGS HAVE BEEN CHANGED

I HAVE PROBLEMS CONNECTING TO WEB SITES

SETUP NETWORK COMPUTERS

UNABLE TO ACCESS NETWORK RESOURCES

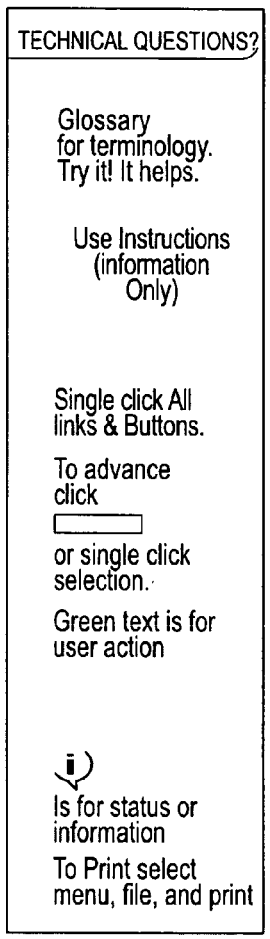

TECHNICAL QUESTIONS?

Glossary for terminology. Try it! It helps.

Use Instructions (information Only)

Single click All links & Buttons.

To advance click or single click selection.

Green text is for user action i)
Is for status or information

To Print select menu, file, and print

Click Hero to go back and select another problem.
User ID:1000021159

FIG.13

HOW TO SELECTION

*pinpoint.com*

Customer Problem Identification

Step 2

| TECHNICAL QUESTIONS? |
|---|
| Glossary for terminology. Try it! It helps. |
| Use Instructions (information Only) |
| Single click All links & Buttons. |
| To advance click ☐ or single click selection. |
| Green text is for user action |
| ⓘ Is for status or information |
| To Print select menu, file, and print |

Software Symptom Selection

You will now choose the Problem/Symptom below that best describes the issue you are experiencing with your software. Select the "How-To" option to receive program usage instructions.

Problem Symptoms

• One program displays an error or does not function correctly

• Multiple programs or MS Windows have errors

• Settings or configurations are incorrect

• I wish to uninstall a program

• Test a Program for Potential Problems

• I have problems Installing a Program

"HOW-TO" Instructions

• I need help on Setup and Usage ("How-to") for a specific program

Our 3-Step Computer Support Process Solves Computer Problems Quickly and Effectively.
User ID:1000021159

FIG.14

HOW TO'S

*pinpoint.com*

Customer Problem Identification

"HOW-TO" SOFTWARE INSTRUCTION SELECTION"

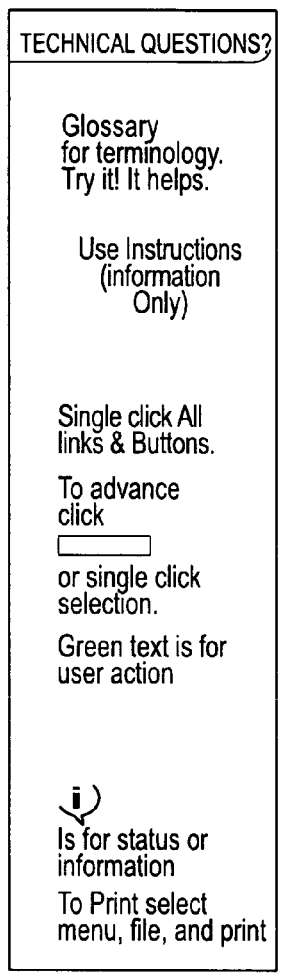

You will now select a "How-To" instructional category, operation type a tutorial:

First - Single Click on the category [+] to get Drop Down Menu.

Second- Single Click on the operation [+] to get a list of tutorials.

Third - When no [+] Or [-] Click on the tutorial you wish to view.

How To Categories

- EXCEL
  -DATA
    + Import External Data
  - EDIT
    + Copy
  - FILE
    + Open
    + Print Preview
  -FORMAT
    + Cells
    + Rows
    + Sheet
  -INSERT Choose Another Program.
Click here for more selections.

If you have completed your education.
Click here to Go To Summary Page.

Our 3-Step Computer Support Process Solves Computer Problems Quickly and Effectively.
User ID:1000021159

FIG.15

UTILITY OR TOOL WRAP DISPOS

*pinpoint.com*

Customer Problem Identification

Step 2

Personalized Quickfix List

You will now step through a customized list of Fix instructions designed to repair your selected problem. Read Button & Link use Instructions below first, then proceed to 'Fix 1' to begin the repair process. Once complete you may wish to diagnose additional failed devices at the bottom of this page.

Additional Failed Devices Detected
(Please diagnose after completing Fixes below)

BUTTON & LINK, USE INSTRUCTIONS

 Show Me FIX — Displays step-by-step Fix Instructions.
⚠ HELP — I want help with Fix Instructions.
Click for Summary — Go to Session Summary page.
Click to Diagnose — Diagnose additional 'Failed' Devices.

 1st Problem
Status: i wish to remove advertisements and pop-ups

Fix 1 of 2
Use Ad-Aware to scan system and remove known spyware. Click on "Show Me Fix" to be shown step by step fix procedure.

 First ...... Click on this button to be shown the step-by-step fix procedure.

 HELP ...... Click on this Button for 24hr live help.

Fix 2 of 2
Remove Pop-ups by installing Toolbars with enhanced Pop-up Blocker. Click on "Show Me Fix" to be shown step by step fix procedure.

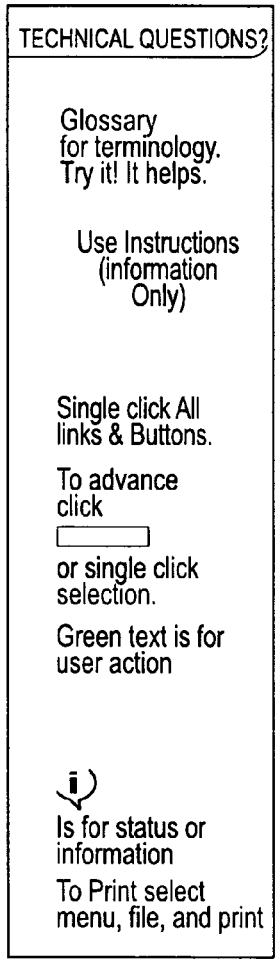

FIG.16A

 First ...... Click on this button to be shown the step-by-step fix procedure.
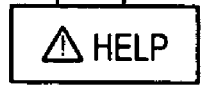 HELP ...... Click on this Button for 24hr live help.
 Click here to Go To Summary Page.
 2nd Problem
Status: Floppy disk drive
        Click here to diagnose this device.
 3rd Problem
Status: SAMSUNG DVD-ROM SD-616Q
        Click here to diagnose this device.
 4th Problem
Status: DM-828
        Click here to diagnose this device.
User ID:1000021159
FIG.16B

COLLECTING APPLIANCE PROBLEM INFORMATION OVER NETWORK AND PROVIDING REMOTE TECHNICAL SUPPORT TO DELIVER APPLIANCE FIX INFORMATION TO AN END USER

CROSS-REFERENCE TO RELATED APPLICATIONS

This application is a continuation-in-part of U.S. patent application Ser. No. 10/450,011, now abandoned, filed Nov. 5, 2003 (which is a continuation-in-part of U.S. patent application Ser. No. 09/713,966, now abandoned, filed Nov. 15, 2000) and is also a continuation-in-part of U.S. patent application Ser. No. 09/713,966, now abandoned, filed Nov. 15, 2000. This application also claims the benefit of U.S. Provisional Patent Application No. 60/520,957, filed Nov. 17, 2003. The entire disclosures of each of the above-identified patent applications are hereby incorporated herein by reference.

FIELD OF THE INVENTION

The present invention is related to a system for knowledge management and intelligent content delivery. In particular, the present invention provides an integrated interface for the collection of information and the use of collected information in the dynamic delivery of intelligently filtered content or knowledge to an end user.

BACKGROUND OF THE INVENTION

The delivery of dynamically generated and intelligent content or knowledge (intelligent refers to the information being specifically targeted) to users of appliances, such as technical support, instructions or other information, is important to ensuring service quality and customer satisfaction. However, providing content or knowledge such as technical support is expensive and time-consuming. Furthermore, the process of obtaining technical support can be frustrating for end users, particularly where suggested fixes fail to correct the stated problem, where repeated contacts with technical support personnel are required, or where the end user is required to repeatedly explain their problem or questions to technical support personnel.

In a typical technical support solution, a technician may obtain information regarding the perceived problem being experienced by an end user each time technical support personnel are contacted. Furthermore, while such systems may enable technicians to take notes that can be viewed later by that technician or by other technicians, such notes are often incomplete, imprecise and disconnected. Therefore, identifying a problem being experienced by an end user and providing follow-up services typically require time-consuming and often repetitive queries directed to the end user or to the database regarding the problem appliance. In addition, technical support personnel have a limited body of information that they can draw from to provide end users with solutions. In particular, solutions generally consist of problem solving procedures that have been administered or created by other personnel and approved by yet another group for delivery to end users. This process can and often does lead to solutions taking weeks and/or months to be applied to real world systems for use by tech support personnel. Due to the creation of such solutions being so time-consuming, technical support personnel are often forced to work from adhoc tools or notes, and more often than not end up providing solutions to problems that are either out of date, or lack in consistency of delivery; this being especially true with regard to newly introduced systems, software or devices, or newly created or arising viruses, conflicts or other problems.

In order to assist technical support personnel in problem solving, systems may provide end users and/or the technicians with a knowledge base of information, for example consisting of frequently asked questions. However, knowledge bases are often difficult to search or require advanced understanding to use effectively, and often apply to slightly different situations or variances than those specifically addressed. Furthermore, although provision may be made for storing notes regarding solutions developed or applied by technicians in solving particular problems, such notes are generally not conveniently available to other technicians who would be assisting other end users during different and/or simultaneous time periods. As a result, knowledge gained by individual technical support personnel is often lost. In order to address this problem, technicians may be able to post solutions they have developed to administrators to be considered for inclusion in official solution procedures. However, because doing so typically requires review and editing, substantial amounts of time can elapse between development of the solution by a knowledge/programming engineer and the delivery and availability of that solution to support technicians.

In still other aspects, typical technical support systems require that technicians or end users access solutions based on correctly identifying a problem device or program. Accordingly, it may be difficult for the actual cause of problems to be identified, and solutions applied.

SUMMARY OF THE INVENTION

Embodiments of the present invention provide an integrated system for collecting information regarding a problem being experienced by an end user, accessing information regarding possible solutions to the described problem identifying specific content in the form of approved fixes or potential fixes, and collecting information regarding the efficacy of proposed fixes with respect to particular reported problems. In particular, embodiments of the present invention provide an intelligent content delivery system in that results are narrowly targeted to solve a presented problem. In order to provide such intelligent content delivery, information regarding the presented problem and/or content for addressing that problem are filtered. Embodiments of the present invention also are capable of dynamically generating content. Such dynamic questions may be in the form of making content developed by a technician available in real-time or substantially real-time to other technicians for delivery to end users. In addition to improving the efficiency with which problems being experienced by individual end users are resolved, embodiments of the present invention improve the efficiency of technical support personnel also referred to herein as "technicians" or "support technicians" by facilitating the quick resolution of end user problems, and by allowing technicians to simultaneously communicate with a number of end users simultaneously. In addition, embodiments of the present invention provide a system that allows a knowledge base to be populated efficiently, and allows technical support personnel to access potential fixes, even if such fixes have not been formally administered by a content developer. Embodiments of the present invention may also enable technical support personnel to create potential fixes and make those potential fixes available to an end user or to other technical personnel in real-time.

In accordance with embodiments of the present invention, administered dynamic dispositions or administered solutions to reported problems, hereinafter referred to as "approved fixes," are maintained as part of a solutions set database. The dynamic dispositions may be accessed in multiple ways, for example by entering information related to a problem being experienced by an end user. Furthermore, such information may comprise a key indicator linking a symptom to an approved fix and/or a potential fix. Approved fixes and potential fixes are delivered to the end user in a logical, step-by-step solution sequence. In addition, for example where an approved fix for a reported problem does not appear in a database of approved fixes, a potential solution may be provided to the end-user, to resolve their issues based on the live creation of a solution set (i.e., potential solution) by the support technician. As used herein, a potential solution is a solution that has not been formally administered and added to the database of approved fixes. Where a potential solution is newly created by a technician, that potential solution may be added to the solutions set database (i.e., the knowledge base). Accordingly, the content that can be delivered from the knowledge base is dynamic in that the available content is changing. Furthermore, embodiments of the present invention can automatically index a newly created potential fix based on appliance components, features or aspects selected during or associated with the potential fix. The potential fix may also be associated with one or more key indicators. In accordance with embodiments of the present invention, after an approved fix or a potential fix has been suggested or otherwise delivered to an end user, information regarding whether the approved fix or potential fix was successful in solving the reported problem is collected. Such information may then be added to a database and the probability or success rate associated with an approved fix-problem pair or potential fix-problem pair can be updated. For example, approved fixes and/or potential solutions can be weighted to indicate the probability that a particular problem will be solved by a particular approved fix, potential solution, or set of approved fixes or potential solutions, and ordered accordingly when presented to the end user. Furthermore, the weightings of approved fixes or potential solutions may be dynamically updated in real-time, as data regarding their efficacy with respect to a problem is collected. Alternatively, or in addition, approved fixes may be ordered according to their simplicity. In accordance with an embodiment of the present invention, the weighting comprises a number of times that the solution (i.e., the disposition or potential solution) has successfully resolved a problem. Accordingly, information that can be accessed in connection with providing end user support can be updated in real-time or near real-time. Furthermore, data regarding potential fixes and the results of applying such fixes to problems can be placed in attention files, for ready access by a content developer, thereby allowing the content developer to consider the potential fix for addition to the dynamic disposition database.

In accordance with embodiments of the present invention, the system provides a technical support specialist or technician with an integrated interface that allows the technician to simultaneously access information regarding a reported problem, including the history of problems regarding a particular machine, if any, a tree view of devices and software installed on the machine or available on like machines generally, and any approved fixes or potential fixes that have been associated with a selected problem or with a selected key indicator. In addition, potential fixes developed by a technician can be made available to other technicians, and/or to manufacturers, in real-time or near real-time. The interface may additionally provide facilities to allow the technical support specialist to chat with, e-mail or otherwise communicate with an end user, including telephonic communications, or to push solutions or information (such as a URL) to an end user.

BRIEF DESCRIPTION OF THE DRAWINGS

FIG. 8 is a screen shot of a technician tool disposition/potential solution view in accordance with embodiments of the present invention;

FIG. 9 is a screen shot of a technician tool potential quick fix creation view in accordance with embodiments of the present invention;

FIG. 10 is a screen shot of an end user problem identification display in accordance with embodiments of the present invention;

FIGS. 11A-C are screen shots of an end user problem identification, hardware selection display in accordance with embodiments of the present invention;

FIG. 12 is a screen shot of a hardware symptom selection display in accordance with embodiments of the present invention;

FIG. 13 is a screen shot of another example hardware symptom selection display in accordance with embodiments of the present invention;

FIG. 14 is a screen shot of a software symptom selection display in accordance with embodiments of the present invention;

FIG. 15 is a screen shot of a software instruction screen in accordance with embodiments of the present invention;

FIGS. 16A and 16B are screen shots of a personalized quick-fix list in accordance with embodiments of the present invention;

DETAILED DESCRIPTION

Figure 1:
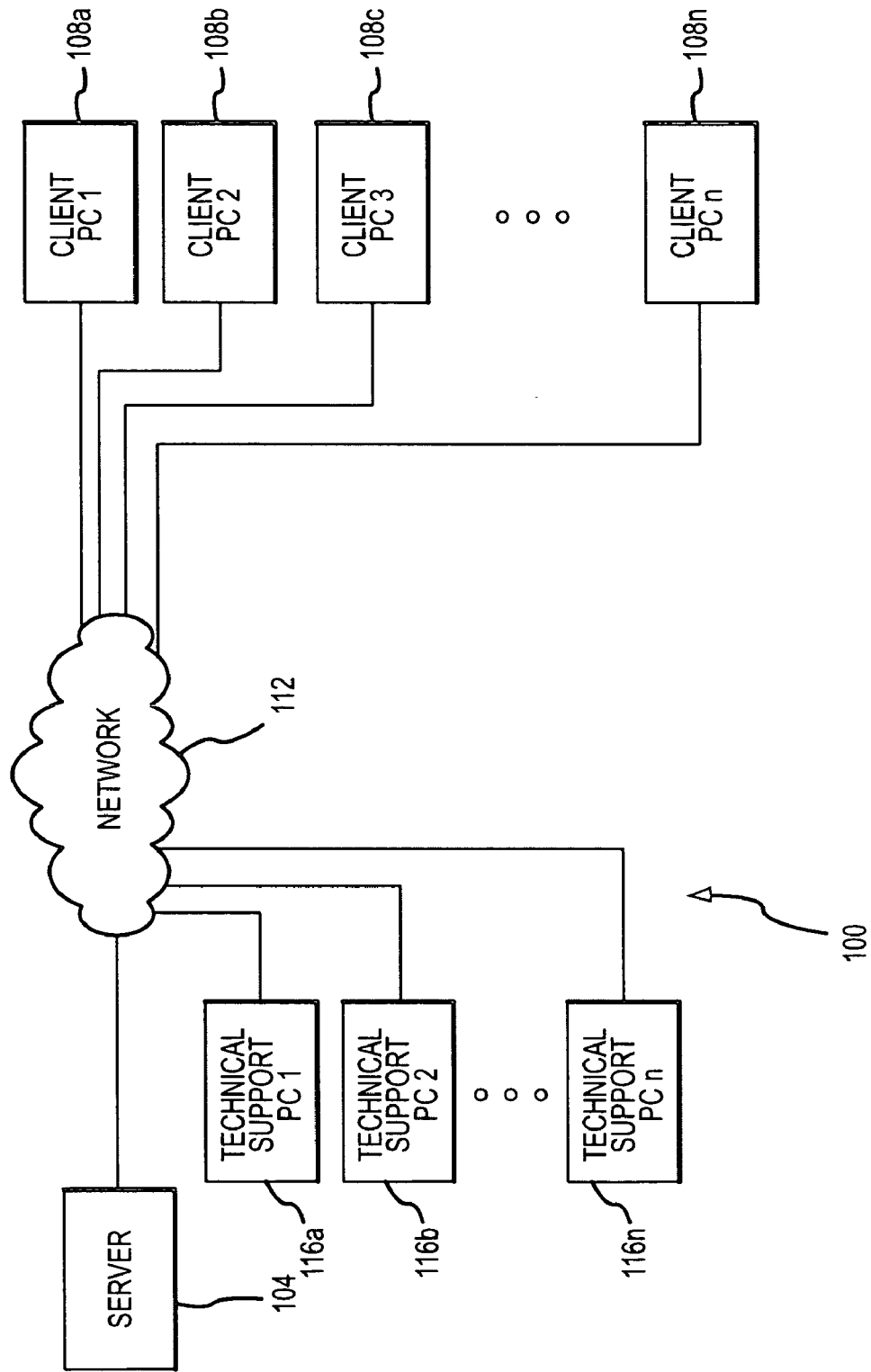
FIG. 1 is a block diagram depicting components of a system in accordance with embodiments of the present invention.

FIG. 1 illustrates a system 100 in accordance with embodiments of the present invention. The system 100 generally includes a server 104 interconnected to one or more client computers 108a to 108n by a network 112. In general, the network 112 may be any computer network or means of establishing communications between two computers, including the Internet and wireless methods. In addition, the network 112 may comprise a number of interconnected networks. Although FIG. 1 shows a server 104 interconnected to a number of client computers 108, it should be appreciated that the system 100 does not require more than one client computer 108. As used herein, the term client computer 108, in addition to a general or personal type computer, may also refer to a variety of digital devices capable of communicating with another digital device, including personal digital assistants (PDA's) or other hand held devices. In accordance with still other embodiments of the present invention, a client computer 108 may comprise any appliance that requires or may benefit from live or automated technical support as described herein. In addition, it should be appreciated that a client computer may comprise any appliance or component within an appliance. As used herein, a client computer or appliance 108 may comprise any product or device, including cars, household appliances, medical equipment, industrial equipment or other devices or programs running on a device.

The system 100 may additionally include one or more technical support computers 116a-n. As shown, the technical support computers 116 may be interconnected to the server 104 and to a selected one or ones of client computers (i.e., appliances) 108 through the network 112. Alternatively or in addition, one or more of the technical support computers 116 may be interconnected to the network 112 and to a client computer 108 through the server 104.

Figure 2:
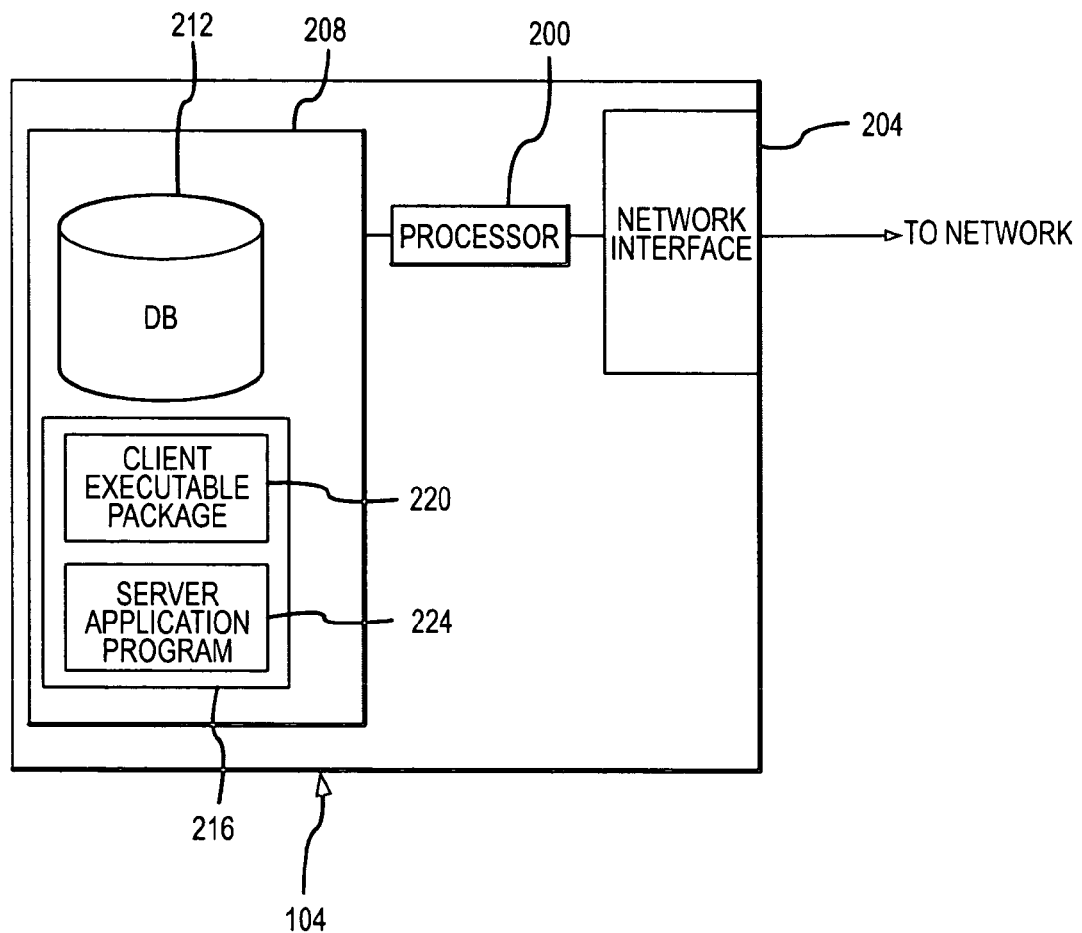
FIG. 2 is a block diagram depicting a server in accordance with embodiments of the present invention.

With reference now to FIG. 2, a server 104 in accordance with an embodiment of the present invention is illustrated. The server 104 generally includes a processor 200, a network interface 204 and storage 208. The storage 208 may include a database 212 and stored programs 216. The stored programs 216 may include a client executable package 220 and a server application program 224. In addition, stored programs 216 may include scripts, tests, measurements or other programs and/or data.

In general, the processor 200 may be any computer processor suitable for use in a general purpose server computer. For instance, the processor 200 may comprise one or more INTEL PENTIUM class microprocessors. The network interface 204 may be any communications interface suitable for interconnecting the server computer 104 to a communication network 112. For example, the network interface 204 may comprise a TCP/IP interface or others. The storage 208 may comprise any mass media storage device, such as a hard drive, tape drive, or optical drive. In addition, the storage 208 may comprise multiple devices of various types.

The database 212 may be any control program and associated records suitable for storing and organizing information. The client executable package 220 generally includes programs for downloading to client computers 108. The server application program 224 includes the commands and instructions required to coordinate the registration of users with the system 100, the downloading and execution of components of the client executable package 220, and the exchange of information between the database 212 and the client computers 108. Accordingly, the server application program 224 may include components to interface the database 212 to the client computers 108.

Figure 3:
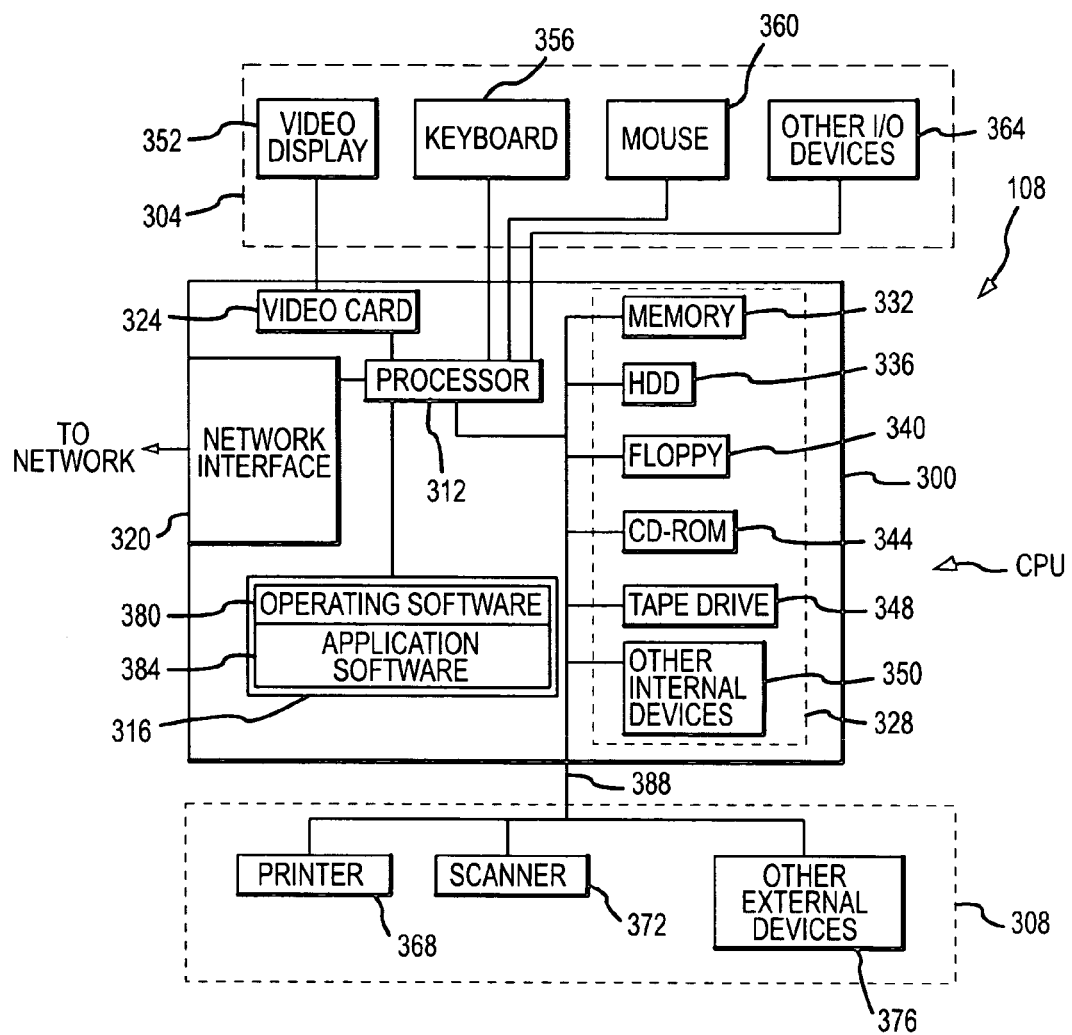
FIG. 3 is a block diagram depicting a client appliance/application/component or a technical support computer in accordance with embodiments of the present invention.

FIG. 3 depicts a client computer 108 and/or a technical support computer 116 in accordance with embodiments of the present invention. According to one embodiment of the present invention, a computer 108, 116 is any general or personal type computer. According to a further embodiment of the present invention, a computer 108, 116 is a PC computer running a MICROSOFT WINDOWS®, APPLE MACINTOSH, or other operating system. The term technical support computer 116 may also refer to a general purpose type computer or to a network appliance.

The computer 108, 116 may comprise a central processing unit (CPU) 300, input/output devices 304 and peripheral devices 308. According to one embodiment of the present invention, the CPU 300 generally includes a processor 312, storage 316, a network interface 320, a video card 324 and a plurality of internal devices 328. The internal devices may comprise memory 332, a hard disk drive 336, a floppy disk drive 340, a CD-ROM drive 344, a tape drive 348 and other internal devices 350. The input/output devices may include a video display or monitor 352, a keyboard 356, a mouse 360 and other input/output devices 364 such as audio devices and additional pointing devices. The peripheral devices 308 may generally include a printer 368, a scanner 372 and other external devices 376. The computer 108, 116 may also include operating software 380 and application software 384. In general, the various components of the client computer communicate with one another over a communications bus 388.

Figure 4:
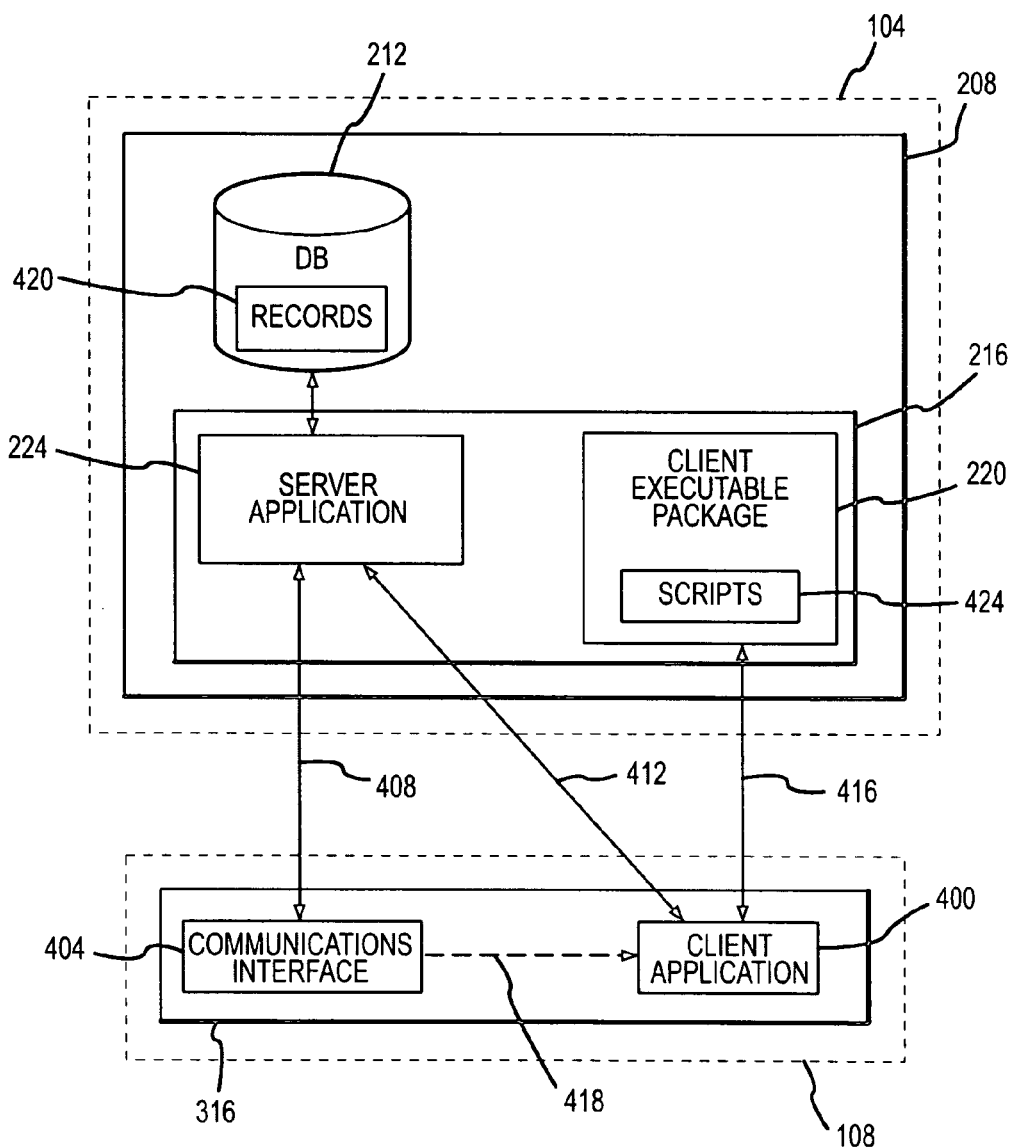
FIG. 4 is a block diagram depicting communications between a server and a client appliance in accordance with embodiments of the present invention.

With reference now to FIG. 4, the logical lines of communication between the server 104 and the client computer 108 are illustrated. In general, a first logical line of communication 408 extends between the server application 224 and a communications interface 404. The communications interface 404 may include any communications application running on the client computer or device 108 that is capable of passing data between the client computer or device 108 and the server application program 224. For example, the communications interface may comprise an Internet browser. Similarly, a second logical line of communication 412 extends between the server application 224 and the client application 400. A third logical line of communication 416 extends between the client executable package 220 and the client application 400. As is evident from FIG. 4, except for an identifier communication path 418, there is generally no direct line of communication between the client application 400 and the communications interface 404. Accordingly, with the exception of passing an identifier from the communications interface 404 to the client application 400 over the identifier communication path 418, as will be described below, the client application 400 and the communications interface 404 communicate via the server application 224. The physical communications link over which the logical communication channels 408, 412 and 416 are established may comprise the computer network 112 and associated network interfaces 204 and 320 described above. The physical communications link over which the identifier communication path 418 is established may comprise the communications bus 388 or internal registers.

The operation of the client application 400 and the communications interface 404 may be synchronized to each other by monitoring a field in tables or records 420 stored in the database 212 through an interface provided by the server application 224. This arrangement allows the client application 400 to be implemented as a relatively small program that requires relatively few of the client computer's 108 system resources to operate. In particular, it allows the client application 400 to control aspects of the operation of the client computer 108 without requiring a program that is integrated with the communications interface 404. More particularly, the client application 400 may be selectively provided with diagnostic tools, such as individual commands or application scripts 424 that perform selected functions. For example, the diagnostic tools may comprise code that is capable of execution while residing on the client computer 108. This is advantageous, as programs integrated with a communications interface 404, such as an Internet browser, that are capable of detailed interaction with the operational aspects of the client computer 108 typically consume a relatively large amount of system resources. In addition, such programs may not be compatible with all versions or types of a communications interface 404. Accordingly, the arrangement illustrated in FIG. 4 enables the present invention to function even on client computers 108 having compromised performance characteristics, for example due to a problem requiring diagnosis. The arrangement illustrated in FIG. 4 also allows the present invention to operate in cooperation with a wide range of communications interfaces 404.

Figure 5A:
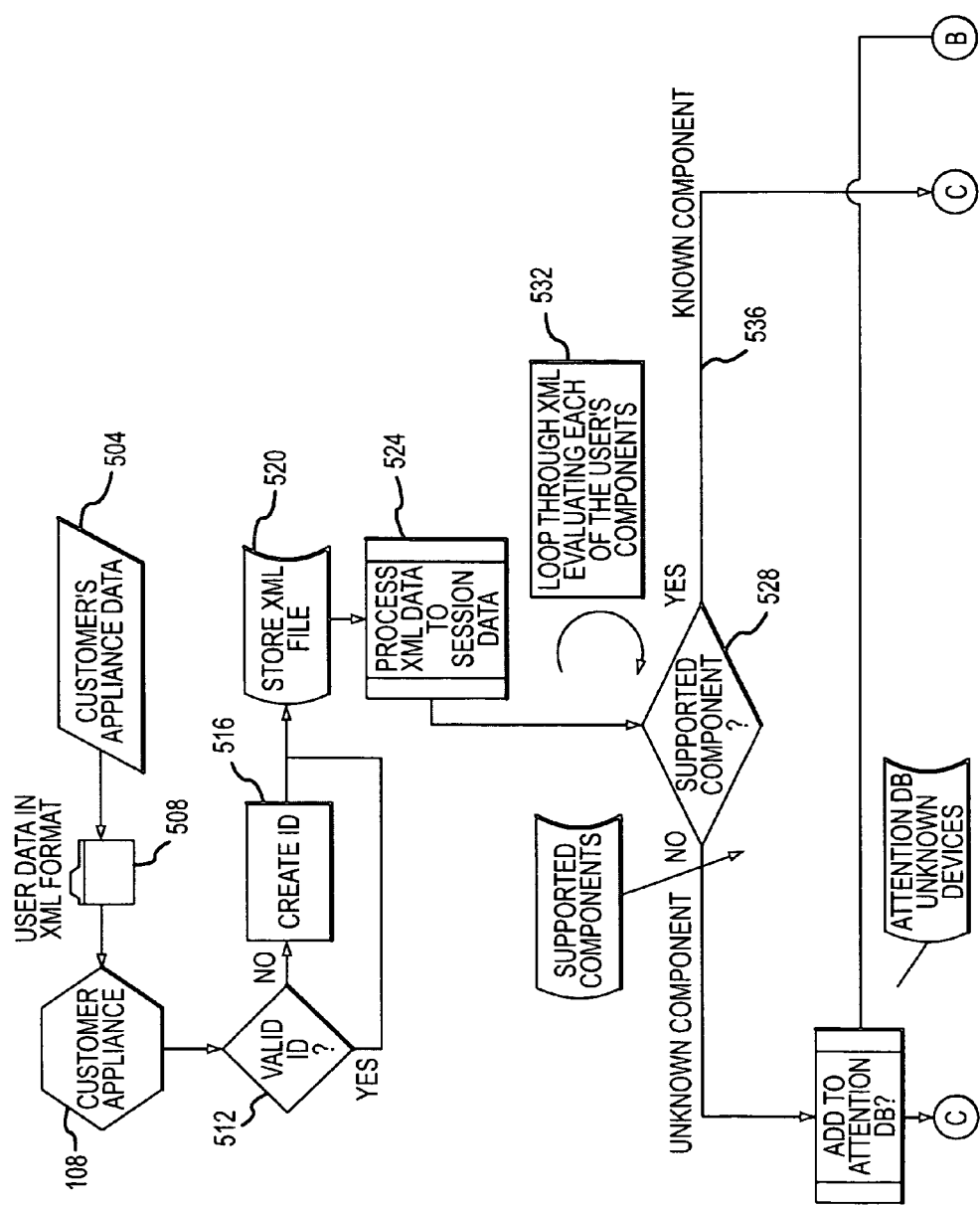
FIGS. 5A and 5B are flow charts depicting aspects of the operation of a system in accordance with embodiments of the present invention.
Figure 5B:
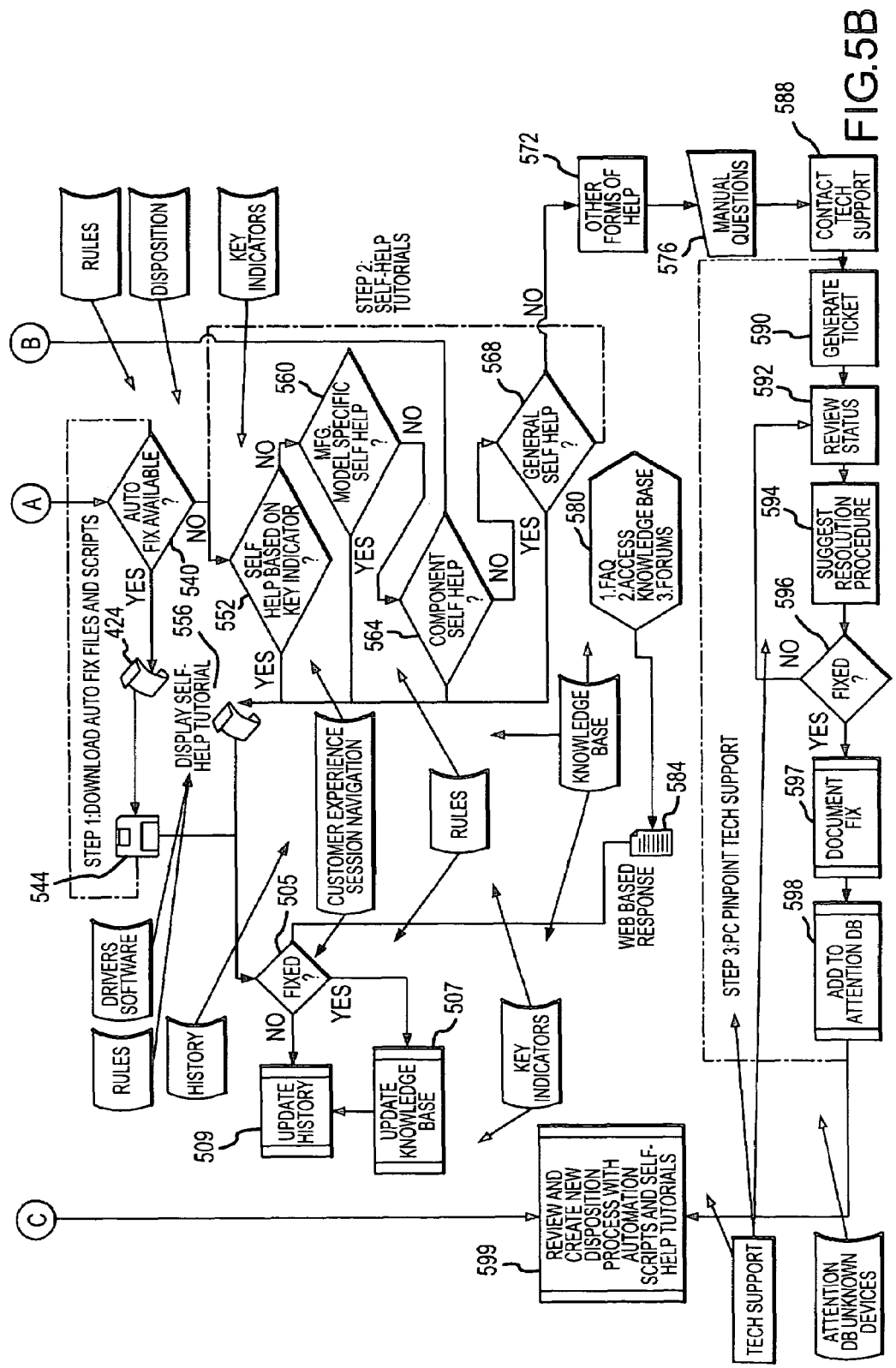

With reference now to FIGS. 5A and 5B, a process for managing knowledge and delivering content in accordance with embodiments of the present invention is illustrated. With particular reference now to FIG. 5A, appliance data 504 is collected on the appliance or client computer 108. In accordance with embodiments of the present invention, the appliance data comprises a number of items of information about the appliance 108, such as information regarding characteristics and features of the appliance and included components, such as hardware components, peripherals and software. Accordingly, appliance data 504 may comprise an inventory. In addition, appliance data can comprise information from the end user collected by presenting the end user with filtered or targeted questions. Because the questions are filtered, they can be different for different types of problems. For example, the end user may initially be asked to generally indicate the problem or perceived problem. From that initial indication, more narrowly directed questions can be presented. For example, if the initial indication suggests a hardware problem, the end user can be asked to identify or select the particular hardware device and then select the symptom being experienced. If the initial indications suggest a software problem, the end user can be asked to first select the symptom (because software problems can involve a number of programs) and then identify the problem program. For an appliance comprising an automobile, the end user may be asked the make of the automobile, model, component and perceived problem. Accordingly, information can be collected in an efficient, targeted manner, depending on the type or nature of the appliance. In general, the appliance data 504 can be collected in a number of ways, including queries directed to the end user, and automated inventory and test scripts or programs. Accordingly, appliance data can be collected through operation of a client application 400 (see FIG. 4). The client application 400 may place the appliance data 504 in a standard format, such as in an XML format 508.

After the appliance data 504 has been placed in a standard format 508, the appliance 108 may initiate contact with the server 104. For example, such contact may be initiated as a TCP/IP connection established over the network 112. Upon initiating contact, the server 104 may determine whether the appliance 108 and/or the associated end user has presented a valid identifier at decision block 512. The identifier may reside on the appliance 108 and may be received or passed to the server 104 by a script or other means. If a valid identifier has not been presented, an identifier can be created (step 516). As can be appreciated by one of skill in the art, the creation of an identifier can include collecting identifying information from the end user and/or the appliance 108, and billing or account information. Furthermore, it can be appreciated that a number of identifiers may be associated with a session involving communication between an appliance 108 and a server 104. For example, an end user may have a number of appliances 108. Accordingly, identifiers may include a customer or end user identifier and an appliance 108 identifier. Furthermore, the combination of an end user identifier and an appliance identifier may result in the assignment of a unique session identifier assigned for use in connection with a particular problem associated with the end user identifier-appliance identifier pair.

Once it has been determined that a valid identifier has been presented, or after creating an identifier, the appliance data 504 is stored (step 520), for example in the database 212 associated with the server 104. As noted above, the appliance data 504 may be stored in a standard format, such as XML format. The stored XML data is then used as session data that is processed (step 524). In general, processing of the appliance data 504 includes evaluating components identified as part of the appliance data 504 and determining whether problems with such components have been identified, either by the end user or by automated test programs performed in connection with collection of the appliance data 504. With respect to each component, a determination is made at decision block 528 whether such component is supported. As used herein, a component may include a hardware device, such as a peripheral or integrated hardware component associated with the appliance 108, or a software component, including operating system software, application software, software drivers associated with peripherals or hardware, or other scripts or programs. As indicated by block 532, the process of determining whether a component is supported is performed for each component identified in the appliance data 504.

If it is determined that the component is a known component (branch 536), a determination may be made as to whether an automated fix is available (step 540, FIG. 5B). As used herein, an automated fix is an approved fix that can be automatically delivered (i.e., delivered to an end user without requiring the assistance or intervention of technical support personnel). If an automated fix is available, it may be provided to the appliance 108, for example in the form of a script for execution on the appliance 108 by a client application 400, as depicted at block 544. Such scripts 424 may comprise diagnostic programs, tests, measurements, utilities and/or other instructions that may be capable of correcting problems associated with a reported or detected system. Scripts 424 may also include scripts that cause the execution or operation of programs already resident on an appliance 108. The delivery of an automated fix may be targeted to address a specific problem identified during testing performed as part of gathering the appliance data 104, during later testing of a component, while checking for conflicts between components, or problems identified by the end user. Also in connection with the determination as to whether an automated fix is available at step 540, various information may be used to identify key indicators. For example, the identification of key indicators may comprise the application of rules associated with a particular problem or problems component reported by the end user. Key indicators may also be identified based on a problem component or combination of components identified by applying rules as part of automated procedures. Therefore, it can be appreciated that key indicators can be identified at each point that information regarding the appliance 108 is obtained. As used herein, a key indicator may include any piece of information that allows or assists in the linking of a symptom to a solution or diagnostic process. Accordingly, a key indicator may include a selected symptom, a test result, measurement, error code, setting, selected component, combination of components, selected problem, calculation, trigger, action or other identified characteristic. If a key indicator can be identified or derived from the appliance data 504 or from testing of the appliance 108, and if that identified key indicator is associated with an automated fix, the automated fix thus identified is delivered. In addition to the use of key indicators, generalized rules and disposition results may be applied as part of determining whether an automated fix is available, for example as an alternative or in addition to automated fixes associated with any identified key indicators. The process of determining whether an automated fix is available may be performed in connection with each known component 536 or combination thereof.

In accordance with embodiments of the present invention, the process of evaluating the user's components and applying available automated fixes to components comprising software or that are associated with software based on collected information and/or key indicators is performed for each such component. After consideration of potential automated fixes for such components has been completed, the process for checking for such software or software associated components in applying potential automated fixes is done. The process may then continue on to determine whether self-help is available based on an identified key indicator. The consideration of self-help may be performed for each component identified in the appliance data 504 after first determining whether an automated fix is available for each such component or may be performed after a determination as to whether an automated fix is available for each individual component is performed (step 552). As used herein, self-help may comprise instructions to the end user regarding steps that the end user can take in connection with resolving a problem, and/or determining the cause of the problem. Accordingly, self-help may be delivered in the form of a self-help tutorial 556. A self-help tutorial may comprise textual instructions, illustrated instructions, and/or multi-media instructions to the end user regarding the steps to be taken, and may be presented as an intelligently ordered sequence of steps or fixes.

If it is determined at step 552 that self-help based on a key indicator is not available (or if a key indicator has not been identified), a determination may be made as to whether self-help associated with a component identified by the end user or through automated procedures as being problematic is available (step 568). This determination may be made after each component identified as being problematic or potentially problematic is evaluated for self-help based on key indicators, or after all components and aspects of the appliance 108 have been evaluated for self-help based on a key indicator. If such self-help is available, it may be displayed to the end user as one or more self-help tutorials 556.

If at step 560 it is determined that a manufacturer or model specific self-help is not available, a determination may be made as to whether self-help for a component identified by the end user or through automated procedures as being problematic is available (step 564). This determination may be made after each component is evaluated for self-help based on each component identified as being problematic is evaluated for self-help based on the identity of that component or after all such components have been evaluated for self-help based on their identity. If self-help associated with the identified component based on the manufacturer or model is available, it may be displayed to the end user as one or more self-help tutorials 556.

If component self-help is not available, a determination may be made as to whether general self-help is available (step 568). If general self-help is available, it can be displayed to the end user as one or more self-help tutorials 556. In accordance with embodiments of the present invention, the process of identifying self-help tutorials may be performed for each component identified as being problematic or potentially problematic, or for each reported problem in turn, after the process of downloading and applying automated fixes has been performed.

The identified fixes or self-help may be delivered to the end user as a set of problem specific, directed solutions. Individual fixes or self-help within the set of solutions can be ordered in various ways. For example, automated fixes or self-help that is believed to be particularly pertinent to a reported or detected problem may appear at the top of the list. Examples of such automated fixes and self-help are those that have been identified based on a key indicator, because of the ability of a key indicator to link a problem to a particular solution. At a next level, automated fixes or self-help that have been identified based on information related to the manufacture and/or model of a component may be delivered. Next, an automated fix or self-help based on an identification of the component generally may be provided. Finally, because it is less narrowly targeted to a reported or detected problem, general self-help or automated fixes can be delivered. In accordance with still other embodiments of the present invention, automated fixes may be presented at the top of the list followed by self-help procedures ordered as described about. Providing automated fixes first may be desirable, because they are easy and convenient for the end user to apply to the appliance 108.

If an automated fix or self-help is applied to the appliance 108, a determination may be made as to whether that automated fix or self-help was successful in fixing the problem (step 505). If the automated fix or self-help was successful, the knowledge base applied by the system is updated to indicate a successful problem resolution (step 507). Furthermore, the successful resolution can be used to adjust the weighting applied to the particular automated fix or self-help tutorial that was successful. In addition, the history associated with the end user and end user-appliance pair is updated (step 509). If any identified automated fix or self-help tutorials are not successful at fixing the identified problem, the history associated with the end user and appliance pair is also updated (step 509) to reflect the steps that have been taken by the end user in attempting to resolve the identified problem.

The process may also allow an end user to access other forms of help (step 572). Such other forms of help may include questions entered by the end user (step 576). In response to such questions, the end user may be presented with or directed to reference information 580, such as frequently asked questions, knowledge based entries, and forums. Furthermore, the end user may be requested to provide a web-based response 584 indicating whether the information 580 resulted in a successful problem resolution.

The end user may also contact technical support personnel for assistance in resolving problems (step 588). In accordance with embodiments of the present invention, the end user contacts technical support personnel after attempts at resolving the problem using automated fixes, self-help, and/or reference information has been unsuccessful. Alternatively or in addition, an end user may contact tech support prior to applying automated fixes, self-help, or accessing reference information, or after making use of some available automated fixes, self-help, or reference information.

Upon being contacted, the technical support personnel generates a ticket (step 590). Contact with a technician may be in various forms. For example, such contact may be in the form of voice telephone, Internet chat or e-mail communications. After generating a ticket, and as described in greater detail elsewhere herein, the technician that has been contacted may review the appliance data 504 and information related to steps that have been taken so far in attempting to resolve the problem with the appliance 108. That is, the technician may review the status (step 592) of problem resolution attempts. The technician may then suggest a resolution procedure (step 594). A resolution procedure suggested by a technician may include the running of an automated fix or performance of steps that may be included as part of a self-help tutorial.

In addition, the technician may suggest that the end user apply a potential solution. As used herein, a potential solution comprises a resolution procedure that has not been formally administered by a knowledge engineer, but that has been applied to successfully resolve a reported problem in the past. Accordingly, potential fixes may include resolutions developed by other (or the same) technicians associated with other (or the same) end users and/or appliances. As described in greater detail elsewhere herein, a system in accordance with embodiments of the present invention may make a resolution developed by a technician available from the database or knowledge base as a potential fix immediately after the potential fix is saved to the database. Thus, the body of potential fixes included in the database may increase over time. Furthermore, in addition to increasing the breadth of problems that can be addressed by solutions in the database, the accumulation of potential fixes can result in solutions involving a reduced number of steps. A reduction in the number of steps can result from the refinement of solution procedures, and/or more particularly defining components, problems and/or key indicators associated with a fix.

At step 596, a determination is made as to whether the suggested resolution was successful in correcting the reported problem. If the suggested resolution successfully fixed the problem, the fix is documented (step 597), and the documented fix is added to a potential solutions or attention database (step 598) for consideration by knowledge engineers in connection with the possible creation of an approved fix (step 599). That is, as potential resolutions are added to the attention database, they may be reviewed by knowledge engineers. Based on the potential fixes, new disposition processes comprising automating scripts and/or self-help tutorials may be created for application as approved fixes in connection with later instances of the associated problem. In addition, the fix added to the attention database 598 is made available as a potential fix for use by other technicians and/or in connection with other problem instances, even before or if it becomes an approved fix. If the problem is not successfully fixed, the technician may continue to review the status of the problem and suggest additional resolution procedures. Accordingly, it can be appreciated that the knowledge base of approved fixes is dynamic, and that it can increase in the breadth of problems addressed, and can provide more narrowly targeted and/or efficient problem resolution processes, either manual or automated, over time.

From the description provided herein, it can be appreciated that dynamic dispositions include different types of potential resolutions that are generally presented in series to an end user. In particular, at an initial stage, an attempt is made to identify automated fixes for delivery to the end user. The delivery of automated fixes is desirable because such fixes are easy for the end user to apply to the appliance 108. If automated fixes cannot be identified or are not successful in resolving the problem, at a second stage, an attempt is made to identify self-help tutorials. Self-help tutorials are steps that can be performed by the end user in attempting to resolve the problem being experienced. Accordingly, self-help can be accessed by the end user and applied, without requiring interaction with technical support personnel. If self-help tutorials cannot be identified or are not successful in resolving the problem, the end user may be referred to other references. In addition or alternatively, at a third stage, the end user may be referred to technical support personnel for assistance in resolving the problem. As described in greater detail elsewhere herein, technical support personnel may access automated fixes and self-help tutorials, both in the form of approved fixes and potential solutions through the identification of key indicators and/or the specification of a problem component in varying levels of detail. Furthermore, the technical support personnel can craft custom or new problem resolution procedures.

Figure 6:
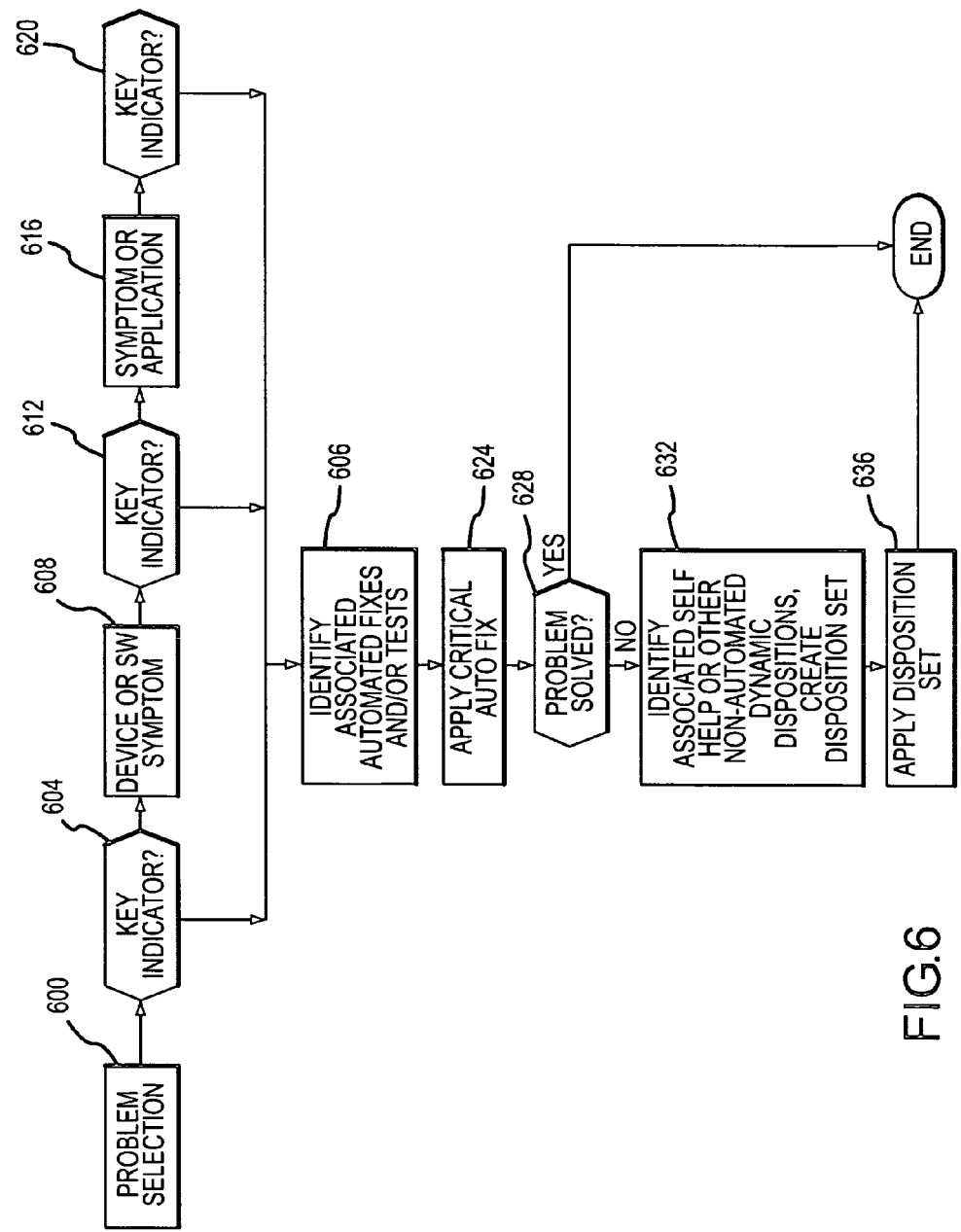
FIG. 6 is a flow chart depicting the identification of key indicators in connection with problem solving or knowledge delivery or intelligent content delivery in accordance with embodiments of the present invention.

With reference now to FIG. 6, steps associated with the delivery of automated fixes and dynamic dispositions (i.e., approved fixes or potential fixes) in accordance with embodiments of the present invention are shown. Initially, at step 600, the end user selects a problem that the end user is experiencing. Based on the end user's indication of the problem, a check is made as to whether a key indicator can be identified. In general, a key indicator can be any diagnostic indication associated with a problem or problem component. Accordingly, examples of key indicators include test results, settings, alerts, measurements, error codes, selected devices, selected problems, selected symptoms, or any other information that can be used as a diagnostic indicator. If a key indicator is identified, any automated fixes and/or tests associated with the identified key indicator may be identified. That is, an approved fix or potential solution may be applied. Furthermore, it should be appreciated that, at least as an initial procedure, an approved fix or potential solution may include a diagnostic procedure. Accordingly, application of a diagnostic procedure may result in or enable the identification of additional key indicators. Furthermore, in accordance with embodiments of the present invention, dynamic dispositions returned in response to a key indicator identified by information entered by the end user, or from automated procedures, and without the assistance of a technician, may be limited to approved fixes. According to other embodiments, dynamic dispositions comprising potential fixes may be provided (e.g., pushed) to the end user by a technician.

Information regarding a particular device or devices or software symptom (step 608) may also be used in identifying additional key indicators and in turn to identify associated automated fixes or tests (step 612). In addition, particular symptom or application information 616 may be used in connection with identifying other key indicators and associated automated fixes or tests (step 620). From the key indicators, automated fixes and/or tests are identified and collected (step 606). As an optional step, if any critical problems with the appliance 108 can be corrected using an identified automated fix, such automated fix may be applied at step 624. A determination may then be made as to whether the problem was solved (step 628) and the process may end if that determination is in the affirmative. If the problem is not solved by application of an automated fix, or in embodiments that do not first apply an automated fix, self-help or other non-automated dynamic dispositions are identified from the key indicators, and a disposition set is created (step 632). The disposition set may include automated fixes, self-help, or other procedures or information. In accordance with embodiments of the present invention, the disposition set is ordered, such that automated fixes are presented at the top of the list and such that dispositions (for example approved fixes) following the automated fixes are ordered according to the probability that they will successful resolve the problem. Accordingly, embodiments of the present invention permit the delivery of targeted, problem specific procedures and information to the end user. At step 636, the end user may apply selected procedures (or all of the procedures) included in the disposition set, and the process of delivering automated fixes and self-help to the end user may end. From this point, additional procedures, such as contacting technical support personnel, may be performed if problems persist with the appliance 108.

Figure 7:
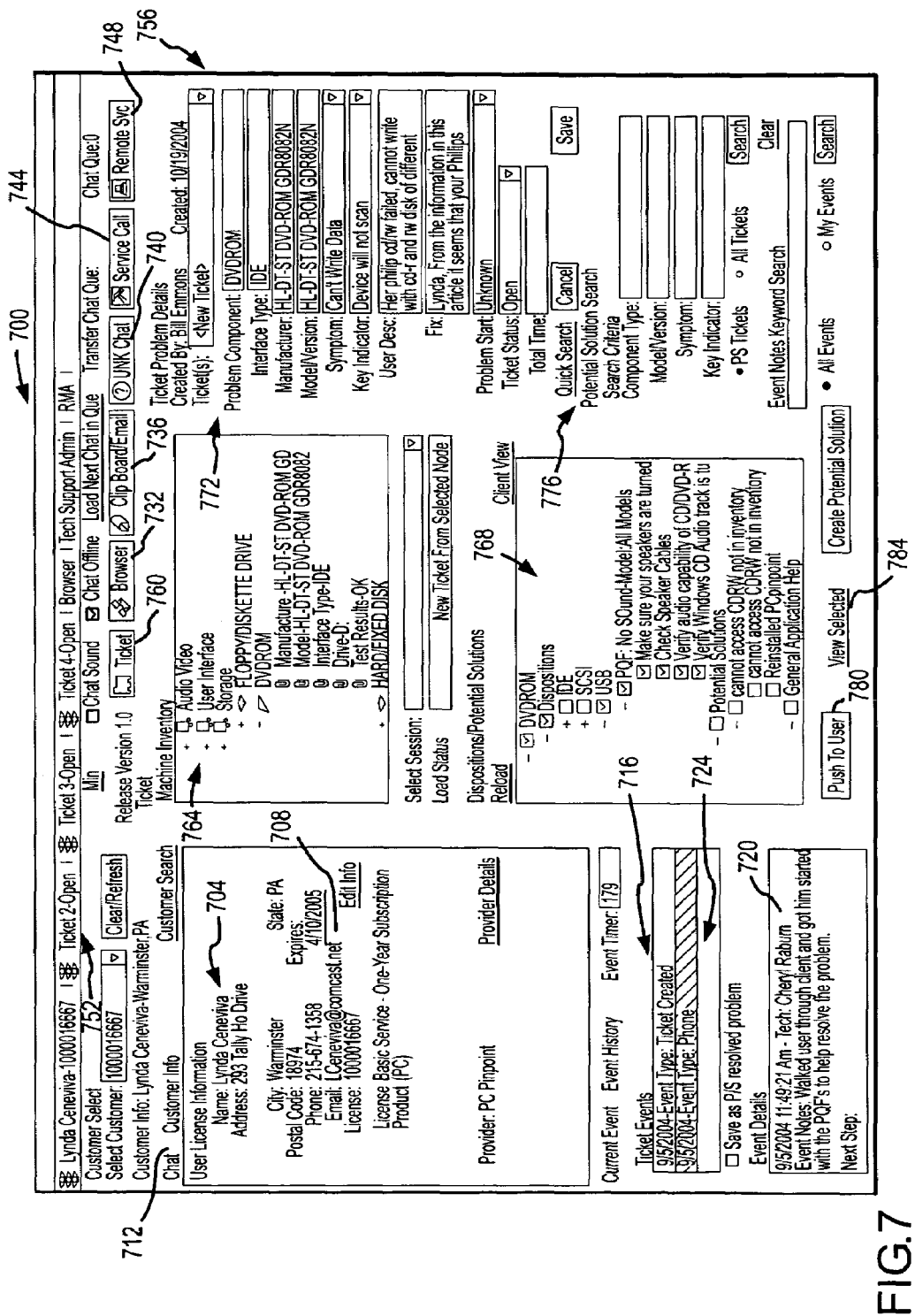
FIG. 7 is a screen shot of a technician tool inventory ticket in accordance with embodiments of the present invention.

With reference now to FIG. 7, a screen shot of a technician tool inventory ticket 700 in accordance with embodiments of the present invention is illustrated. In general, the inventory ticket 700 presents information identifying the end user, the appliance 108, details related to the problem being experienced, and information related to available and/or completed dispositions, such as test results, tests and procedures performed, problem resolution history, etc.

An end user information window 704 identifies the end user, and provides access to contact information. For example, hyperlinks 708 and tabs 712 may be provided to allow the technician to communicate with the consumer, for example by email or by using real-time chat. Tabs and fields may also be provided to permit the technician to edit user information, check provider or multiple affiliation service level agreements, or perform other functions.

A ticket history area 716 includes information regarding the reported problem and associated disposition, which is displayed in an event details window 720. In general, an event comprises an interaction between the end user and technician with respect to a particular problem. The ticket history area 716 of the inventory ticket screen 700 allows the technician to view events related to the consumer's machine in a ticket events window 724. Accordingly, the technician is provided with information regarding the consumer's previous contacts with technical support, and any previously attempted fixes. Such information can assist the technician in determining how technically knowledgeable the consumer is, the consumer's level of frustration, and any fixes that were previously applied but that were not successful in resolving the reported problem.

Various links and buttons may be provided to allow the technician to take action with respect to the resolution or handling of a consumer problem. For example, buttons may be provided to allow the technician to open a new ticket, open a browser 732 in a sub-window for research or to view information that will be provided to a consumer as an approved fix or as a potential fix, or to view another web page, as specified by an associated universal resource locator address. Buttons may also be provided to access a clipboard/ email 736, unknown chat screen 740, service call initiation 744, or remote service 748 functions such as remote control of the appliance 108, remote updating of service, version control or other functions. A return merchandise authorization (RMA) button 750 may also be provided to generate a return merchandise authorization, or inventory or logistic information.

The technician inventory ticket 700 also allows the technician to easily access other tickets, independently of communication type, by clicking on provided tabs 752. Accordingly, a technician can provide resolution services to a number of consumers simultaneously or substantially simultaneously, improving the efficiency of the technicians and therefore the technical support operation. The ticket information area 756 displayed when the ticket tab 760 is selected provides the technician with machine inventory 764, disposition/potential solution 768, ticket problem details 772, and potential solution search 776 information windows or areas.

The information populating the machine inventory window 764 may be collected in various ways. For example, the information may be obtained by running a script in connection with a client application running on the end user's machine to obtain an inventory of installed devices and software. In addition or alternatively, the information regarding machine inventory can be obtained by manually entering the information, for example based on information provided by the end user. The machine inventory information may be displayed in a tree view, to allow information regarding particular sub-systems or devices and their test results to be displayed in a selected level of detail. In particular, a technician may choose to expand or contract entries displayed in the machine inventory window 764. For example, in the entries displayed in the example of FIG. 7, categories of components including audio video, user interface and storage are shown. A "+" symbol next to an entry indicates that it can be selected to display subentries or child node components (i.e., more detailed information). A "−" symbol indicates that any applicable sub-entries in a next lower level have already been selected for display (i.e., that all nodes within the next higher category have been displayed).

In the example view shown in FIG. 7, the storage entry has been expanded, and can be seen to include a floppy/diskette drive, DVD ROM, and hard/fixed disk entries. In general, the three entries under storage comprise storage devices that have been detected during an automated inventory procedure and/or that have been identified by the end user as being present in the appliance 108. Within the individual storage devices, the DVD ROM device has been expanded to display a number of details regarding the device, including the manufacturer, model, interface type, drive letter, and test results (i.e., the results of automated test procedures). Accordingly, it can be appreciated that the machine inventory window 764 presents to a technician information regarding components and/or aspects of the appliance 108. Furthermore, such information may be made available to the technician by the machine inventory window 764 from the moment the end user and the technician engage in communications with one another. Therefore, the technician need not query the end user for such information, which may reduce end user frustration levels, and which may reduce the amount of time that a technician must spend gathering basic information. In addition to displaying information regarding the appliance 108, the machine inventory window 764 allows a technician to control information displayed in other of the windows by selecting a particular entry in the machine inventory window 764.

The dispositions/potential solutions window 768 may also display information using a tree-type structure. Furthermore, the particular set of dispositions displayed in the window 768 may be automatically populated according to a device or software application identified in the machine inventory as being problematic and selected by the technician by highlighting the applicable machine inventory window 764 entry. The displayed dispositions generally comprise approved fixes in the form of potential quick fixes (PQFs) that have been formally administered by a content administrator. The dispositions may include instructions to the end user, for example delivered to a browser on the end user's machine, a script for performing automated fixes in connection with a client application installed on the end user machine, and/or the provision of software patches or replacement software to the end user. Potential solutions comprise fixes that have not been formally administered by a content administrator, but have been identified as being of possible use in connection with a particular problem. As described in greater detail elsewhere herein, a potential solution may be made available to technicians as soon as a technician has determined the potential solution successfully resolved a problem. The probability that a particular disposition or potential solution will result in a successful resolution of the identified problem may be indicated in the form of a number of times that the disposition or potential solution has successfully resolved a problem and/or the ordering or ranking of the PQFs and potential fixes. One or more available dispositions/potential solutions may be provided to the end user by highlighting the desired disposition or dispositions, and clicking on the push to user button 780.

The disposition/potential solutions window 768 will allow a technician to review in varying levels of detail dispositions (i.e., approved fixes) and potential solutions that have been identified in connection with the selection made in the machine inventory window 764. Where a key indicator has been selected, the information displayed by the disposition/potential solutions window 768 may be determined by the selected key indicator. In the example of FIG. 7, check marks appearing next to entries in the solutions window 768 indicate actions that have been performed in attempting to resolve the problem at issue. More particularly, the selection of DVD ROM in the machine inventory window 764 has resulted in the display of dispositions and potential solutions associated with a DVD ROM device to be displayed in the disposition/potential solutions window 768. As shown in the present example, certain of the entries are capable of displaying detailed information, allowing the technician to consider the presented information in varying levels of detail. In addition, actions that have been taken by the end user in attempting to resolve the problem are automatically recorded and are displayed to the technician as checkmarks next to such actions. Accordingly, it can be seen from the example that potential quick fixes associated with a problem "no sound" have already been performed. However, there are a number of potential solutions for the selected device that have not been performed. Using the information displayed in the disposition/potential solutions window 768, the technician can synchronize with the end user and walk the end user through one or more potential quick fixes that are or may be applicable to the problem being experienced. The technician can also push descriptions of potential quick fixes or dynamic dispositions that have not been attempted to the end user. For example, by selecting one or more of the potential solutions and then pressing the "push to user" button 780, the technician may deliver the potential solutions, for example in the form of automated scripts or step-by-step instructions, to the end user. In addition, the technician can push potential solutions just then developed by the technician to an end user. If such a newly developed potential solution successfully resolves the problem, it can be stored to the attention file database by choosing to save the potential solutions. Information pushed to the end user can also include scripts, executable programs, URLs, tests, measurements or any combination thereof. For example, an updated virus detection program can be pushed to an end user that indicated that their problem was caused by a virus.

The ticket problem details area 772 provides fields identifying the device or software identified as being problematic. The fields are automatically populated when the end user navigates through problem selection, for example in response to queries to the end user, and may include information regarding a particular manufacturer and model of the identified device and identification of any associated drivers, or version of identified software, where such information is available, and may also be populated based on the selections made in the machine inventory window 768. In addition, the information regarding the problem appliance, device or software is identified by a ticket identifier. The organized association of particularly identified devices or software with information regarding the reported or identified problem allows information regarding the field reliability of devices and software to be collected quickly and stored in an organized fashion. Such information is of particular interest to hardware or software providers, as it allows problem areas to be identified quickly and with particularity. In addition, the organized association of devices or software with dynamic dispositions and with potential solutions developed in connection with a ticket created for the appliance, device or software, and the associated symptoms, allows the potential solution to be accessed in a targeted and efficient manner by technicians.

The ticket problem details area 772 also includes a key indicator field. In particular, when key indicators are available, for example based on the information related to the problem component, interface type, manufacturer, model/version, and/or symptom, such key indicator may be available for selection by the technician. Furthermore, more than one key indicator may be identified. In accordance with embodiments of the present invention, the selection of an identified key indicator by a technician will cause the dispositions/potential solutions window 768 to be populated with the dispositions and/or potential solutions associated with the selected key indicator. According to other embodiments of the present invention, the selection of a key indicator will supplement or modify the items already populating the dispositions/potential solutions window 768 based on the selections that have been made in the machine inventory window 764. Because the key indicator serves as a link between a problem and solution pair, the identification of a key indicator can be very effective in resolving appliance 108 problems.

The potential solution search window 776 allows the technician to search for potential solutions across multiple device or software categories, and/or to search for solutions that have not yet been formally associated with a device or category. The provision of a search tool therefore allows the technician to access potential solutions as soon as they have been entered into the system. Accordingly, as new or potential solutions to problems are discovered or developed by technicians, other technicians can access information regarding those potential solutions immediately.

Figure 8:
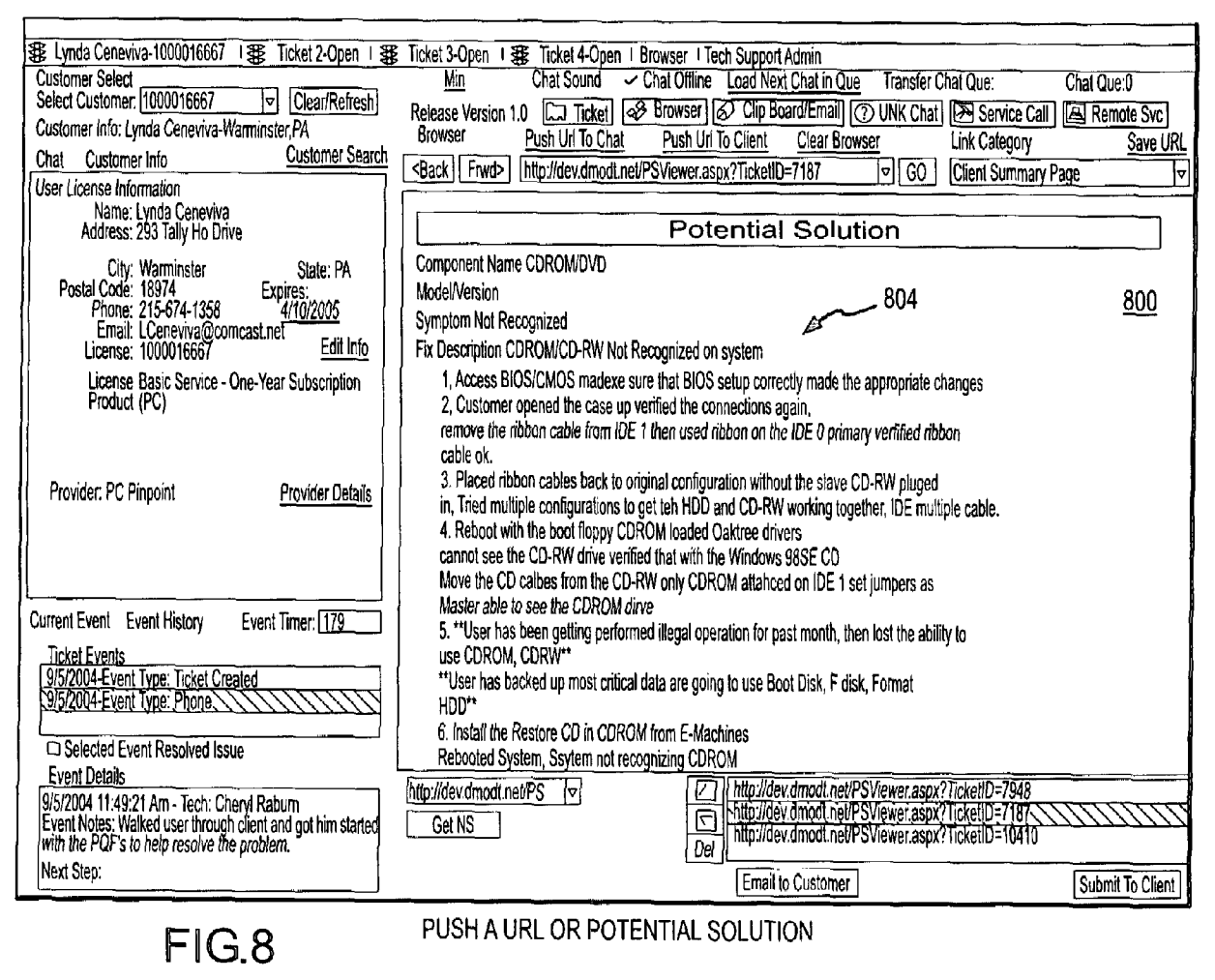

FIG. 8 is a screen shot of a technician tool potential solution screen 800 in accordance with embodiments of the present invention. In particular the potential solution screen 800 is an example of information that may be displayed to a technician in response to the highlighting of a potential solution (see FIG. 7), and the selection of the view selected button 784. As shown in FIG. 8, the potential solution information may appear as a summary of a particular problem and resolution steps taken to resolve that problem 804. This information may be entered by the originating technician as ticket event notes taken during the normal handling of a consumer problem. When the same or a different technician later encounters a similar problem, they may have access to the earlier resolution steps, even though those steps have not been formally administered as an approved fix. In particular, the potential solution is automatically associated with a component and/or a key indicator when it is entered by the originating technician. Accordingly, a potential solution may be presented in connection with another session in response to selecting component identification information and/or a key indicator with which the potential solution is associated. Accordingly, the knowledge base of solutions from which technicians may draw can be increased and that knowledge can be accessed in real-time or near real-time.

With reference now to FIG. 9, a technician tool potential solution editing screen 900 is illustrated. In general, the potential solution editing screen provides a ticket event summary 904 that displays technician notes associated with the ticket from which a potential solution will be generated. That is, after determining that a particular action or series of actions suggested by a technician (or a series of technicians) over one (or more) technician-end user sessions, the potential solution editing screen 900 may be presented to the technician, for example after indicating that the solution successfully resolved the end user's problem. The events from which event summaries may be displayed can be selected from a ticket events subwindow 908. A potential solution text field 912 allows the technician to describe the potential solution. Some or all of the description may be copied from the text displayed in the ticket event summary subwindow 904, or from any other source. A brief description of the fix may be entered in a fixed description field 916. By selecting the "save" button 920, the potential solution may be saved such that is available to other technicians (or to the same technician in connection with another ticket). The potential solution is indexed without requiring further information by the technician. That is, the potential solution will be indexed according to the machine inventory information, problems selected, and/or symptom selected when the potential solution was created. Furthermore, the potential solution may appear among a number of potential solutions indicated when a general category applicable to the selected entry in the machine inventory window 764 is later made, as well as when a particular entry corresponding to the selection made when the potential solution was created is later selected. In accordance with further embodiments, the technician may associate the potential solution with a key indicator.

With reference now to FIG. 10, a screen shot of an end user problem identification display is illustrated. In general, the screen allows an end user to select from general categories of problems that the end user may be experiencing in connection with an appliance 108. In the example of FIG. 10, the problems relate to an appliance 108 comprising a general purpose computer. By making selections from the end user problem identification display, the end user may provide information that can be used to deliver an appropriate fix, and may be used in addition or as an alternative to inventory and problem information collected using automated procedures. In accordance with embodiments of the present invention, the ordering and/or selection of problems included in the general categories of problems is configurable based on the frequency with which the problems are encountered. In addition, the ordering and/or selection of problems is configurable based on the appliance, component, application or other identifier or characteristic.

With reference now to FIGS. 11A-11C, an end user problem identification, hardware selection display is illustrated. The end user problem identification, hardware selection screen is generally presented to an end user in response to the selection of a hardware problem at the end user problem identification display (see FIG. 10). In general, the items displayed may be those hardware components identified during automated inventory and/or testing procedures. The items that are displayed are configurable based on any relevant identifier or characteristic. By selecting a particular component that the end user believes is causing the problem being experienced, the range of candidate solutions can be narrowed. Furthermore, such information can be particularly helpful in reaching a solution, as the end user is often better able, at least at this general level, to identify a problem component, as compared to a remote technician.

FIG. 12 is a screen shot of an end user problem identification symptom selection display in accordance with embodiments of the present invention. The symptoms that are displayed are configurable based on any relevant identifier or characteristic. This display may be presented to a user in response to selection of a CDROM drive. Furthermore, the display allows the user to select particular symptoms being experienced with the CDROM drive, or to select general "how to" instructions regarding operations involving a CDROM drive, such as installation and removal.

FIG. 13 is a screen shot of another hardware symptom selection display in accordance with embodiments of the present invention. The symptoms displayed can be selected or ordered based on any relevant characteristic or identifier. For example, this hardware symptom selection display may be presented to the user in response to the selection of Internet or browser problems on the problem selection display (see FIG. 10).

FIG. 14 is a screen shot of a software symptom selection display in accordance with embodiments of the present invention. The symptoms displayed can be selected or ordered based on any relevant characteristic or identifier. The screen may be displayed in response to the selection of a software problem from the problem selection screen shown in FIG. 10.

FIG. 15 is a screen shot of a display that may be presented to an end user in response to selection by the end user of an entry indicating a need for help using a specific program from the software symptom selection screen shown in FIG. 14. In particular, the end user may select certain displayed operations or categories of operation related to an identified software program. Accordingly, FIG. 15 is an example of a view of "how to" instructions from which the end user may make a selection. The instructions displayed can be selected or ordered based on any relevant characteristic or identifier.

With reference now to FIGS. 16A and 16B, a screen shot of a personalized quick-fix list display is illustrated. Such a quick-fix list may be presented to an end user after automated procedures have identified approved fixes and the end user problem identification process has been completed, and/or after a technician has identified and pushed potential fixes for application by the end user. Furthermore, the display may include dynamic dispositions related to a number of reported and/or detected problems. In the example displayed, the first problem has been selected and therefore fixes directed to resolving the first problem are displayed. Where a number of fixes have been identified with respect to a problem, they may be ordered according to the likelihood that the fix will successfully resolve the problem. That likelihood may be determined based on a weighting derived from the number of successful problem resolutions identified with respect to each fix. Alternatively, or additionally, the weighting may be based on the simplicity of the dynamic disposition.

Figure 17:
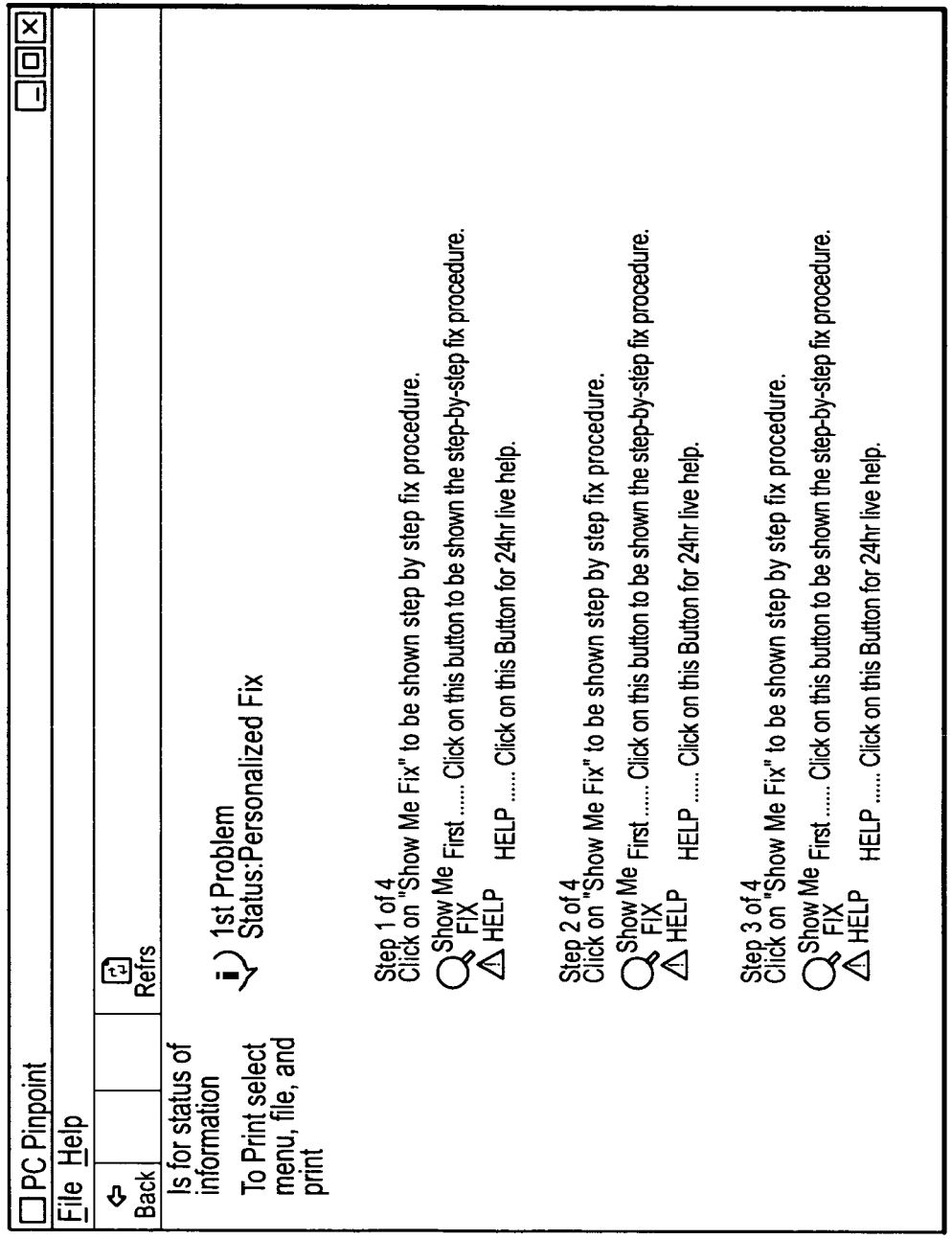
FIG. 17 is a screen shot of step-by-step fix procedures in accordance with embodiments of the present invention.

FIG. 17 is a screen shot of step-by-step fix procedures in accordance with embodiments of the present invention. In the example shown, the fix involves a number of steps. By selecting the "show me fix" button at each step, the end user may access detailed instructions. Help buttons may also be provided to enable the end user to connect to technical support personnel. Accordingly, this is an example of self-help that can be performed by an end user. Furthermore, such self-help may be an automated fix, an approved fix, a potential quick fix pushed to the end user by a support technician.

Figure 18:
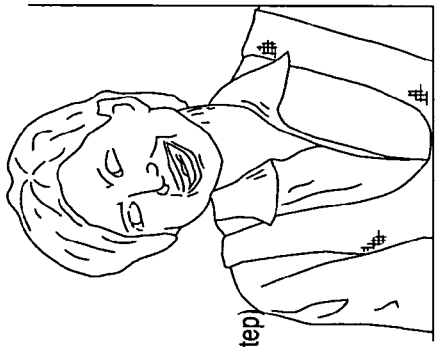
FIG. 18 is a screen shot of an end user problem resolution/confirmation display in accordance with embodiments of the present invention.

FIG. 18 is a screen shot of an end user problem resolution/confirmation display in accordance with embodiments of the present invention. This display may be presented to an end user after suggested procedures have been performed. Accordingly, feedback from the end user is solicited in order to determine whether the problem has been successfully resolved. Therefore, it can be appreciated that validation of a successful fix (or an indication that a fix was not successful) can be collected by the system either from a technician or an end user.

Figure 19:
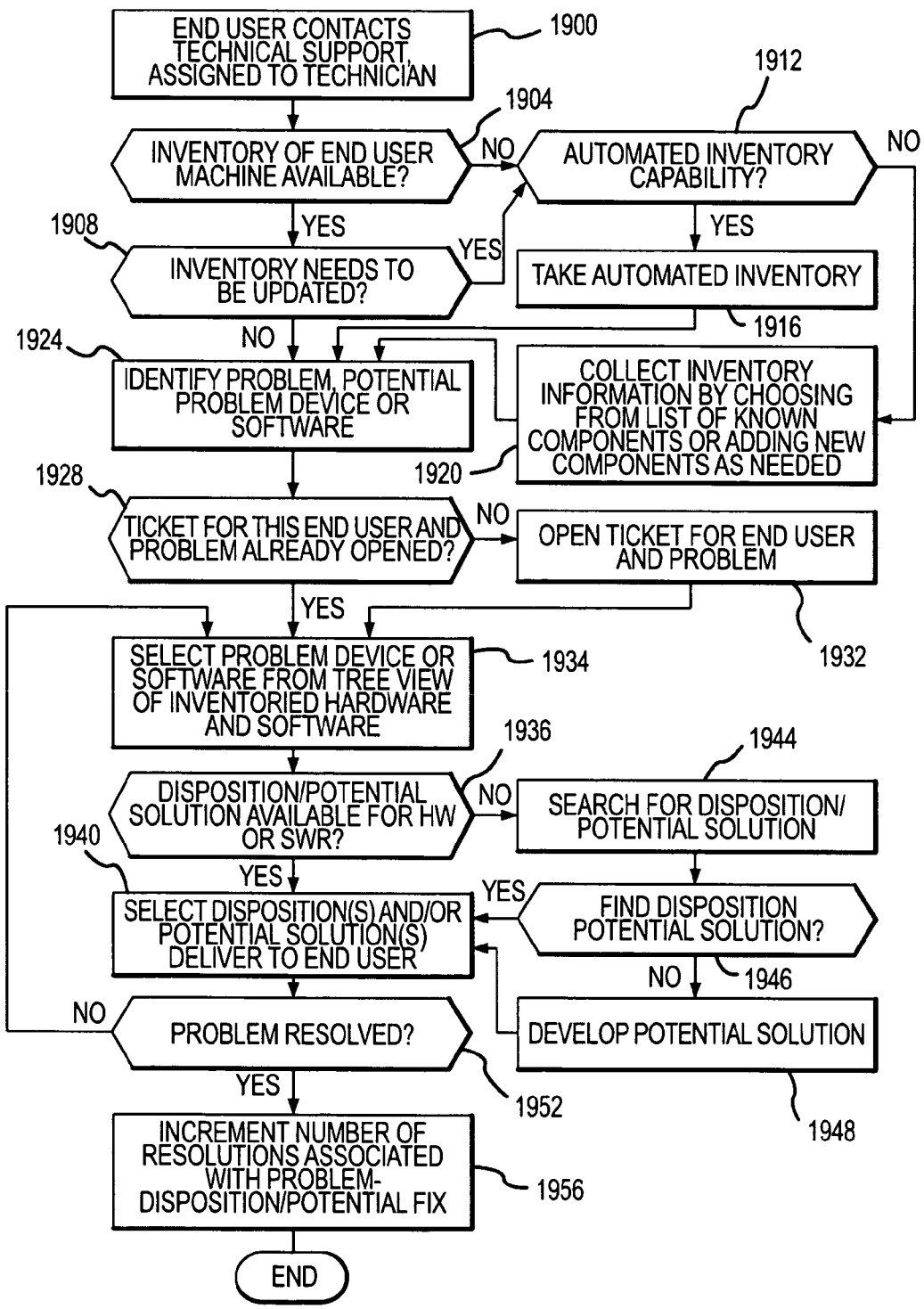
FIG. 19 is a flowchart depicting aspects of the operation of a system once live intervention has been invoked in accordance with embodiments of the present invention.

With reference now to FIG. 19, a flowchart illustrating the operation of a technical support system once live support (i.e., a communication with a technician) has been invoked. In accordance with embodiments of the present invention, in response to an end user request for live technical support, the end user is assigned to a technician (step 1900). At step 1904, a determination is made as to whether an inventory of the end user machine is available. If an inventory is available, a determination is made as to whether the inventory needs to be updated (step 1908). In accordance with embodiments of the present invention, the inventory associated with the end user machine may be updated each time that an end user contacts the technical support center. In accordance with other embodiments of the present invention, the inventory may be updated in response to the receipt of an indication from the end user or from an automated application installed on the end user's machine that new hardware or software has been installed.

If an inventory of the end user machine is not available, or if it is determined that the inventory of the end user machine needs to be updated, a determination is made as to whether the end user machine has an automated inventory capability (step 1912). For example, in accordance with embodiments of the present invention, a client application may be installed on a client machine that includes the capability of taking an inventory of that machine. If the end user machine has an automated inventory capability, an automated inventory is taken (step 1916). If the end user machine does not have an automated inventory capability, inventory information is collected through process of either choosing from a list of known components or adding a new component, whether hardware or software based, to the system on-the-fly utilizing inventory tracking tools (step 1920).

After obtaining inventory information at steps 1916 or 1920, or after determining that previously collected inventory information does not need to be updated, the problem and associated potential problem device or software is identified (step 1924). The identification of a problem may be obtained in the form of a symptom reported by the end user, or as a result of the detection of the existence of a problem automatically, for example using a diagnostic program installed on the end user machine. In accordance with an embodiment of the present invention, a diagnostic program may comprise a client application installed on the end user machine that is capable of running scripts provided to it remotely, for example from a server associated with the technical support center. As can be appreciated by one of skill in the art, the various methods of collecting information may be combined. For example, an automated inventory may be supplemented by information collected from the end user. Similarly, information regarding a problem or problems associated with the end user machine may be collected in the form of information received from the end user or from automated diagnostic procedures.

At step 1928, a determination is made as to whether a ticket for this end user and problem has already been opened. A new ticket is opened if one is not already in existence (step 1932). After opening a new ticket or determining that a ticket has already been opened for the end user and problem, a problem device or software may be selected from the machine inventory, for example displayed in the machine inventory sub-window 208 of an inventory ticket 200 (step 1934). When the problem device or software is selected, entries under the selection may be expanded to show whether fixes have already been applied by the end user. At step 1936, a determination is made as to whether a disposition or potential solution is available for the selected hardware or software that has not already been applied. If a disposition or potential solution is available, one or more dispositions and/or potential solutions may be selected and delivered to the end user (step 1940). If a disposition or potential solution is not available for the hardware or software, or if the ticket history indicates that dispositions and potential solutions associated with the identified hardware or software has not been successful in resolving the reported problem, a search is made for a disposition or potential solution (step 1944). In accordance with an embodiment of the present invention, the search may be a word search that is conducted across hardware and software categories. If the search is successful at finding a disposition or potential solution (step 1946), it may be delivered to the end user (step 1940). If the search does not successfully locate a disposition or potential solution, the technician may develop a potential solution on their own (step 1948) and the potential solution developed by the technician may be delivered to the end user (step 1940).

At step 1952, a determination is made as to whether the reported problem has been resolved. If the problem has been resolved, the number of resolutions associated with the problem-disposition/potential fix pair is incremented (step 1956). Where the resolution was accomplished using a newly developed potential solution, that potential solution is added to an attention file, and is made available to users of the support system. Accordingly, technicians can be provided with immediate access to newly developed potential solutions, even when those potential solutions have not been formally administered. Such access may be made through selection of those components in the machine inventory window 768 (see FIG. 7) that were made when the potential fix was initially displayed, or by selecting a key indicator associated with the potential fix, for example by the technician that developed the potential fix.

If the problem has not been resolved, the procedure may return to step 1932 at which the suspected problem device or software may again be selected, or a new hardware or software item selected, and dispositions or potential solutions reviewed and/or searched, selected and delivered to the end user. As dispositions and potential fixes are delivered to the end user, information regarding the results of application of such dispositions or potential solutions to the identified problem is collected. Such information may be included in the ticket history, and may also be added to attention files, to allow knowledge obtained through the process of resolving each end user's problems to be added to the system.

Although certain of the embodiments described herein relate to a system that includes an appliance such as a client computer in communication with a server through a communication network, and in which a technician may provide support through a separate technical support computer, the present invention is not so limited. For example, the technician may interact directly with the server computer. In addition, automated procedures and self-help may be provided by means other than a communication channel established over a communication network. For example, programming for obtaining information regarding the appliance from the appliance itself and/or from the end user can be supplied in the form of removable media. For instance, tests and content may be disk resident in order to provide self-help where the appliance is unable to contact the server. The collected information may then be made available to a technician through an upload of collected data, or other means.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described herein above are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A system for delivering content and organizing knowledge of information, comprising:
   a processor, said processor executes programming code for obtaining information related to an appliance;
   a user input to receive requests for a problem resolution with respect to said appliance from a user of said appliance, said requests include a user entered selection of a problem made from a list of potential problems;
   a user output to present fixes identified using information related to said appliance provided by said user input;
   a database to store a record of presented fixes applied as part of a problem resolution procedure including:
   a knowledge base of approved fixes, at least one of said presented fixes included in said knowledge base of approved fixes comprises an approved fix that is automatically delivered over a network to the user, at least one of said presented fixes included in said knowledge base of approved fixes comprises a self-help tutorial; and
   an attention database of potential fixes, at least one of said presented fixes included in said attention database of potential fixes comprises a potential fix developed and provided by a technician to the user, said potential fixes are available to technicians including technicians other than the technician that originally developed a potential fix, and said potential fixes are displayed to at least one of said technicians and considered by said at least one of said technicians for inclusion in said knowledge base of approved fixes.

2. The system of claim 1, wherein said user output comprises means for displaying items of information related to said appliance, and means for displaying a number of fixes in response to a selection of one of said items of information related to said appliance.

3. The system of claim 1, wherein said user output comprises means for displaying items of information related to said appliance, means for displaying key indicators in response to a selection of one of said items of information related to said appliance, means for displaying a number of fixes in response to a selection of one of said key indicators.

4. The system of claim 1, further comprising:
   said user output displaying items of information related to said appliance;
   programming code for pushing a problem resolution generated by a technician in response to said request for a problem resolution to a customer associated with said appliance;
   programming code for receiving feedback regarding whether said problem resolution satisfied said request for a problem resolution;
   programming code for indexing said problem resolution according to at least one of one of an item selected from said displayed items of information and a key indicator.

5. A method for delivering content and organizing knowledge of information, comprising:
   obtaining information related to an appliance by a processor;
   receiving requests, by a user input, for a problem resolution with respect to the appliance from a user of said appliance, the requests include a user entered selection of a problem made from a list of problems;
   presenting fixes, by a user output, identified using information related to the appliance provided by the user input;
   storing in a database, a record of presented fixes applied as part of a problem resolution procedure, the stored record including:
   a knowledge base of approved fixes, at least one of the presented fixes included in the knowledge base of approved fixes comprises an approved fix that is automatically delivered over a network to the user, at least one of said presented fixes included in the knowledge base of approved fixes comprises a self-help tutorial; and
   an attention database of potential fixes, at least one of the presented fixes included in the attention database of potential fixes comprises a potential fix developed and provided by a technician to the user, the potential fixes are available to technicians including technicians other than the technician that originally developed a potential fix;
   displaying at least one of the potential fixes to at least one of the technicians, the at least one of the technicians considers the displayed potential fixes for inclusion in said knowledge base of approved fixes.

* * * * *